US012732271B2

(12) United States Patent
Buscaino et al.

(10) Patent No.: US 12,732,271 B2
(45) Date of Patent: Sep. 8, 2026

(54) METHOD AND APPARATUS FOR SPATIAL DIVERSITY SCHEMES IN FREE-SPACE OPTICAL COMMUNICATIONS

(71) Applicant: CIENA CORPORATION, Hanover, MD (US)

(72) Inventors: Brandon Taylor Buscaino, Palo Alto, CA (US); Mohammad Ebrahim Mousa Pasandi, Ottawa (CA); Kim Byron Roberts, Ottawa (CA); Ian Roberts, Sandy Springs, GA (US)

(73) Assignee: CIENA CORPORATION, Hanover, MD (US)

( * ) Notice: Subject to any disclaimer, the term of this patent is extended or adjusted under 35 U.S.C. 154(b) by 386 days.

(21) Appl. No.: 18/483,906

(22) Filed: Oct. 10, 2023

(65) Prior Publication Data

US 2024/0396631 A1 Nov. 28, 2024

Related U.S. Application Data

(60) Provisional application No. 63/503,765, filed on May 23, 2023.

(51) Int. Cl.
*H04B 10/11* (2013.01)
*H04B 10/50* (2013.01)

(52) U.S. Cl.
CPC .......... *H04B 10/11* (2013.01); *H04B 10/503* (2013.01)

(58) Field of Classification Search
CPC .... H04B 10/11; H04B 10/503; H04B 10/112; H04B 10/114; H04B 10/118;
(Continued)

(56) References Cited

U.S. PATENT DOCUMENTS 8,229,304 B1 * 7/2012 Pepper .................. H04B 10/61 398/209
11,546,062 B1 * 1/2023 Moro .................. H04B 10/505
(Continued)

OTHER PUBLICATIONS

Self-adaptive diversity reception of ultra-low-power signal for FSO communication system. Authors: Te Chen, Ao Fang, Xiaozhou Yang, and Weiwei HuAuthors Info & Affiliations Publication: Electronics Letters vol. 48, Issue 7 @ Mar. 29, 2012 (Year: 2012).*
(Continued)

*Primary Examiner* — Hibret A Woldekidan
(74) *Attorney, Agent, or Firm* — Guntin & Gust, PLC; Mark Wilinski

(57) ABSTRACT

A system that incorporates the subject disclosure may include, for example, receiving, via one or more spatially distinct receivers, a plurality of transmitted optical signals associated with a spatially-diverse optical communication link, forming an optical signal based on a combination of the plurality of transmitted optical signals, converting the optical signal to an electrical signal, processing the electrical signal to produce multi-gigabit digital output data, extracting one or more parameters from the electrical signal, and controlling, based on the one or more parameters, the forming of the optical signal, the converting of the optical signal, the processing of the electrical signal, the extracting of the one or more parameters, or any combinations thereof. Additional embodiments are disclosed.

20 Claims, 18 Drawing Sheets

(58) Field of Classification Search
CPC ...... H04B 10/294; H04B 10/58; H04B 10/61; H04B 10/1123; H04B 10/1121; H04B 10/1129; H04B 10/50; H04B 10/40; H04B 10/43; G02B 7/183; G02B 7/1822; G02B 7/1821; G02B 7/182; G02B 7/185
See application file for complete search history.

(56) References Cited

U.S. PATENT DOCUMENTS

| | | | | |
|---|---|---|---|---|
| 2002/0048063 A1* | 4/2002 | Jung | H04B 10/572 398/32 |
| 2004/0166817 A1* | 8/2004 | Mokhtari | H04L 27/06 455/73 |
| 2018/0269648 A1* | 9/2018 | Robinson | G02B 27/1006 |
| 2020/0186258 A1 | 6/2020 | Brown et al. | |

OTHER PUBLICATIONS

"PCT/US2024/029664 International Search Report and Written Opinion", Mailed Nov. 13, 2024, Nov. 13, 2024, 20 pgs.
Chen Te , et al., "Self-adaptive diversity reception of ultra-low-power signal for FSO communication system",, Electronics Letters, the Institution of Engineering and Technology, GB, vol. 48, No. 7, Mar. 29, 2012 (Mar. 29, 2012), pp. 385-387, XP006039258, ISSN: 0013-5194, DOI: 10.1049/EL.2011.3685, Mar. 29, 2012.
Abadi , et al., "FSO Detection Using Differential Signaling in Outdoor Correlated-Channels Condition", IEEE Photonics Technology Letters, vol. 28, No. 1, Jan. 1, 2016, Jan. 1, 2016, 4 pgs.
Al-Habash, M. A., et al., "Mathematical model for the irradiance probability density function of a laser beam propagating through turbulent media", 2001 Society of Photo-Optical Instrumentation Engineers; Opt. Eng. 40(8), Aug. 2001, 9 pages.
Andrews , et al., "Laser Beam Propagation through Random Media", Second Edition, 2005, 808 pgs.
Belmonte , et al., "Capacity of coherent free-space optical links using diversity-combining techniques", Jul. 20, 2009 / vol. 17, No. 15 / Optics Express 12601, Jul. 10, 2009, 11 pgs.
Belmonte, Aniceto , et al., "Sequential Optimization of Adaptive Arrays in Coherent Laser Communications", Journal of Lightwave Technology, vol. 31, No. 9, May 1, 2013, 5 pages.
Billault , et al., "Free space optical communication receiver based on a spatial demultiplexer and a photonic integrated coherent combining circuit", vol. 29, No. 21 / Oct. 11, 2021 / Optics Express 33134, Oct. 11, 2021, 10 pgs.
Choutagunta , et al., "Adapting Mach-Zehnder Mesh Equalizers in Direct-Detection Mode-Division-Multiplexed Links", Journal of Lightwave Technology, vol. 38, No. 4, Feb. 15, 2020, Feb. 15, 2020, 13 pgs.
Djordjevic , "Adaptive Modulation and Coding for Free-Space Optical Channels", vol. 2, No. 5/May 2010/J. Opt. Commun. Netw. 221, May 1, 2010, 9 pgs.
Freier, Christian , et al., "Scalable all-fiber coherent beam combination using digital control", Applied Optics, vol. 61, No. 15, May 20, 2022, 6 pages.
Fried, David L., "Optical Heterodyne Detection of an Atmospherically Distorted Signal Wave Front", Proceedings of the IEEE, vol. 55, No. 1, Jan. 1967, 11 pages.
Geisler, David J., et al., "Multi-aperture digital coherent combining for free-space optical communication receivers", Optics Express 12661; Optical Communications Technology, Massachusetts Institute of Technology Lincoln Laboratory, Jun. 1, 2016, 11 pages.
Hernandez, Daniel Malacara, et al., "Near-Earth Laser Communications", Optical Science and Engineering, 2021, 466 pages.
Kolmogorov, A.N. , "The local structure of turbulence in incompressible viscous fluid for very large Reynolds numbers", Downloaded Jan. 24, 2023, 5 pages.
Larsson , et al., "Coherent combining of low-power optical signals based on optically amplified error feedback", https://doi.org/10.1364/OE.456188 Vol. 30, No. 11 / May 23, 2022 / Optics Express 19441, May 23, 2022, 15 pgs.
Milanizadeh , et al., "Establishing Multiple Chip-to-Chip Orthogonal Free-Space Optical Channels using Programmable Silicon Photonics Meshes", 2022 IEEE Photonics Society Summer Topicals Meeting Series (SUM) | 978-1-6654-3489-8/22/ © 2022 IEEE | DOI: 10.1109/SUM53465.2022.9858129, 2022, 2 pgs.
Morichetti , et al., "Mitigation of Atmospheric Turbulence in an Optical Free Space Link with an Integrated Photonic Processor", OFC 2023 © Optica Publishing Group 2023, Mar. 5, 2023, 3 pgs.
Navidpour , et al., "BER Performance of Free-Space Optical Transmission with Spatial Diversity", IEEE Transactions on Wireless Communications, vol. 6, No. 8, Aug. 2007, Aug. 1, 2007.
Niu, Mingbo , et al., "MIMO Architecture for Coherent Optical Wireless Communication: System Design and Performance", J. Opt. Commun. Netw., vol. 5, No. 5, May 2013, 10 pages.
Popoola, et al., "Error performance of terrestrial free space optical links with subcarrier time diversity", IET Commun., 2012, vol. 6, Iss. 5, pp. 499-506 doi: 10.1049/iet-com.2011.0107, 2012, 8 pgs.
Purvinskis, Robert , et al., "Multiple-wavelength free-space laser communications", Proceedings of Spie; Event: High-Power Lasers and Applications, San Jose, CA, United States, 2003, 9 pages.
Rao, Chenjie , et al., "Toward Practical Digital Phase Alignment for Coherent Beam Combining in Multi-Aperture Free Space Coherent Optical Receivers", IEEE Access, Nov. 4, 2020, 11 pages.
Thi, Mat Nguyen, et al., "Seven-Aperture Direct-Detection Receiver for Free-Space Optical Communication Systems", OFC 2022; Optica Publishing Group 2022, Downloaded Oct. 12, 2022, 3 pages.
Tsiftsis, Theodoros A., et al., "Optical Wireless Links with Spatial Diversity over Strong Atmospheric Turbulence Channels", IEEE Transactions on Wireless Communications, vol. 8, No. 2, Feb. 2009, 7 pages.
Tyson , "Principles of Adaptive Optics—Third Edition", © 2011 by Taylor and Francis Group, LLC CRC Press is an imprint of Taylor & Francis Group, an Informa business International Standard Book No. 13: 978-1-4398-0859-7, 2011, 318 pgs.
Weerackody, V. , et al., "Wavelength Correlation in Free Space Optical Communication Systems", IEEE Xplore, Downloaded Nov. 29, 2022, 6 pages.
Yang, Yan , et al., "Multi-aperture all-fiber active coherent beam combining for free-space optical communication receivers", Optics Express 27519; vol. 25, No. 22, Oct. 20, 2017, 14 pages.
Young, C. Y., et al., "Two-frequency mutual coherence function of a Gaussian beam pulse in weak optical turbulence: an analytic solution", Applied Optics, vol. 35, No. 33, Nov. 20, 1996, 5 pages.
Zheng, Donghao , et al., "Performance enhancement of free-space optical communications under atmospheric turbulence using modes diversity coherent receipt", Optics Express 28879, vol. 26, No. 22, Oct. 24, 2018, 12 pages.
"PCT/US2024/029664 IPRP mailed Jul. 14, 2025", Jul. 14, 2025, 22 pgs.
"EP 24734306.4 Office Action Mailed Mar. 9, 2026", Mar. 9, 2026, 14 pgs.

* cited by examiner

METHOD AND APPARATUS FOR SPATIAL DIVERSITY SCHEMES IN FREE-SPACE OPTICAL COMMUNICATIONS

CROSS REFERENCE TO RELATED APPLICATIONS

The present application claims the benefit of priority to U.S. Provisional Application No. 63/503,765 filed on May 23, 2023, which is hereby incorporated herein by reference in its entirety.

FIELD OF THE DISCLOSURE

The subject disclosure relates to a method and apparatus for spatial diversity schemes in free-space optical communications.

BACKGROUND

Free-Space Optical Communications

Application Spaces

Satellite Constellations

In the past decade, there has been a significant rise in the total number of satellites being launched into low-earth orbit (LEO) with the purpose of serving as nodes in a globe-spanning communications network. Leading companies are SpaceX™, Amazon™, and Telesat™.

These satellites have initially been provisioned with RF links, but in late 2022, have had their optical backbone links turned on.

The optical challenges associated with space-to-space links are somewhat less severe than optical links that traverse atmosphere due to the lack of atmospheric scintillation. It appears that satellite constellation operators are focused on bringing coherent pluggables into space to counteract high beam spread loss, boost data rate, and leverage a maturing market. It appears 100 Gb/s optical links is the primary focus for near-future deployment.

There are other purely space-based applications, specifically NASA's Laser Communications Relay Demonstration (LCRD) is intended to scope out a possible laser relay system from geosynchronous satellites to the moon and beyond (spacecraft launched further into the solar system).

Aerial Terminals

Recently, several companies such as Alphabet (Sonora, Loon), Meta (Aquila), and Lockheed Martin, have explored the use of optical links employed on high-altitude vehicles (HAVs) above the worst atmospheric turbulence. In some cases, the intended purpose is to mimic LEO satellite constellations to provide internet services to ground customers, with more flexible provisioning. Other applications are motivated by increasing the bandwidth of aircraft passenger internet access, whereby an aircraft would use an optical link to connect to a LEO satellite, instead of directly to the ground. Some of these efforts have been postponed or outright cancelled.

While aerial-to-aerial links can avoid most of the challenges associated with optical turbulence, new practical problems are introduced, such as aircraft vibration effects on pointing and tracking, network provisioning of limited flight-time aircraft, and the need for ground-based connectivity. Aerial-to-ground optical links must traverse the atmosphere at some point, introducing an additional bandwidth bottleneck to be discussed in the "Hybrid Optical Links" section below.

Terrestrial Terminals

Ground-based optical links are frequently discussed in the context of backhaul applications for last-mile customers or for difficult terrain where laying fiber is impractical. Shorter optical links may also be used for areas with high RF activity or latency/security-constrained environments. Typically, terrestrial links are between 500 m and 5 km, depending on the environment and operate in the near-infrared. Since atmospheric turbulence is highest near the ground, turbulence mitigation techniques are typically employed, increasing the cost of these systems and positioning them as a niche market. Commercial products have been available for several decades and have recently scaled to 10 Gb/s links.

Hybrid Optical Links

Recently, there has been renewed interest in optical links that traverse multiple of these domains, such as ground-to-air links supporting HAV constellations or ground-to-LEO optical links supporting LEO satellite constellations. In particular, LEO-to-ground optical links may become more prominent in the coming years to address the increase in space-based cross-sectional bandwidth of the constellations. Current traffic-routing solutions utilize RF downlinks from LEO satellites, which are limited by size, weight, and power (SWaP) constraints to around 500 Mb/s.

There are also additional applications that require hybrid optical links besides constellations. Currently, LEO and GEO satellites generate significant amounts of data that must be transmitted to the ground. NASA's Terabyte Infrared Delivery (TBIRD) program is intended to address this bottleneck. However, recent experimental demonstrations have had limited success at transferring data at speeds faster than 5-10 Gb/s aggregate bit rates.

Challenges of Free-Space Optical Communications

Pointing, Acquisition, and Tracking (PAT)

Pointing and tracking between optical terminals has been and continues to be a challenge for modern Free-Space Optical (FSO) systems. Complex control algorithms are required to ensure that the optical beam profile from the transmitter is translated to a receiver beam profile that overlaps with the receiver aperture. While problems plague practical systems, there are well-known and studied techniques for all ranges of free-space optical links.

Severe Weather

Weather such as rain, clouds, or fog, can have deleterious effects on a free-space optical link. Frequently, severe weather causes optical links to go down regardless of the amount of optical power available at the transmitter. In these cases, a slower RF backup link is often required. In some cases, networks can be designed to route signals through multiple other paths if one optical link is unavailable, but to ensure a fixed reliability rate, redundant transmitter and receiver terminals are required. This technique is an example of spatial diversity that will be discussed in the "Turbulence Mitigation Techniques" section below.

Clear-Air Turbulence

Clear-air turbulence is among a class of atmospheric conditions where attenuation of and optical signal is relatively low, compared to vacuum, but atmospheric effects due to air movement, temperature, and pressure, distorts the optical signals in various ways that make reception of the signal difficult. Frequently, clear-air turbulence results in fading, whereby the received intensity of an optical signal decreases rapidly below the receiver sensitivity due to multi-path interference effects in the atmosphere. The observed statistical nature of the received optical intensity through the atmosphere is the basis for many theoretical models.

The most prominent theory of atmospheric turbulence is Kolmogorov's Theory of Turbulence, where the atmosphere is treated as a viscous liquid undergoing turbulent flow. Furthermore, the atmosphere is assumed to be composed of eddies of varying sizes, and in thermal equilibrium there is a distribution of eddies sizes, which, given various other parameters such as wind speed and pressure, determine the total effects of refraction and interference of an optical signal as it traverses the atmosphere. Specifically, the index of refraction structure function, which describes the correlation of the refractive index in the receiver plane, is $$\Phi_n(K) = 0.033\, C_n^2 K^{-11/3},$$

where K is the spatial frequency and $$C_n^2$$

is the refractive index structure constant which describes the overall strength of the turbulence. This theory has led to the theoretical and experimental exploration of the effects of atmosphere on optical transmission, including the optical phase. Additional models have been built up on this theory, such as the Gamma-Gamma model, which will be used later, where atmospheric turbulence is characterized primarily by the size of the smallest and largest atmospheric eddies. These length scales, derived from $$C_n^2,$$

are then used to predict the distribution of the intensities at the receiver plane.

Finally, in the context of free-space optical heterodyne receivers, statistical information about the phase of the received optical signal can be ascertained. Specifically, the coherence length is defined roughly as the length in the receiver plane between points where the phase of the optical signal is well-correlated, which is critical for coherent optical communications systems. The coherence length is related to the link length, wavelength, and turbulence strength:

$$r_0 = 1.68\left(C_n^2 L k^2\right)^{-3/5},$$

valid for a plane wave.

Turbulence Mitigation Techniques

Optical Techniques

Fade Threshold

One technique to avoid intensity fading of an optical signal is to send additional optical power from the transmitter aperture. The ratio of average received optical power to the receiver sensitivity is called the fade threshold. Increasing the fade threshold decreases the probability of a fading event dropping the received signal intensity below the receiver sensitivity, resulting in a link outage. The obvious drawbacks to this method are a decrease in efficiency, decrease in signal to noise ratio (SNR) and potential limitations due to eye-safety concerns. Importantly, some optical links under conditions of high turbulence can experience very deep fades, on the order of tens of dBs, much higher than practical fad thresholds.

Aperture Averaging

Another technique by which atmospheric turbulence can be mitigated is aperture averaging. By increasing the aperture size, additional light is collected and combined in the receiver waveguide. For coherent communications, increasing the aperture size within the coherence length increases the SNR, while aperture averaging is limited past the coherence length.

Adaptive Optics

One compensatory optical technique is adaptive optics, whereby the received optical wavefront is measured and compensated so that the discretized wavefront is coherently summed in the receiving waveguide. By sensing the wavefront, such as with a Shack-Hartmann wavefront sensor, the relative phases of the pixelized wavefront can be estimated and corrected. Necessarily, the use of adaptive optics requires constant temporal updates to the wavefront correcting element as the atmosphere changes.

Networking Techniques

Repetition Coding and ARQ

For many FSO systems, the primary impairment is temporal fading. Depending on the length of the link and the strength of the turbulence, mean fading times can occur on the time scales of tens of microseconds to 10 s of milliseconds. Some systems implement automatic repeat requests (ARQ) so that if packets are dropped in the FSO link, they may be transmitted. Similarly, some links shift the complexity to signal coding and introduce temporal redundancy with various type of repetition coding. In the latter case, the statistical nature of fading is used to reduce the likelihood of an outage, while in the former, fading is dealt with by a higher protocol. Both methods significantly increase the latency of the FSO link.

Adaptive Coding

Some FSO systems utilize adaptive coding to adapt to the unpredictable FSO channel. Frequently in these implementations, a RF back-channel is used to convey information about the FSO channel, which is used to reduce or increase the modulation format order. This requires synchronization at both transmitter and receiver ends as well as a reliable estimator for the channel. In addition, this method is not necessarily compatible with fixed rate networks where optical links are expected to be able to support a specific maximum data rate at any given time.

Diversity-Based Techniques

A method of decreasing the outage probability of an FSO link is by utilizing transmitter or receiver diversity. In its simplest form, identical or similar information is sent across multiple independent of sufficiently uncorrelated channels to increase the probability that the information is successfully transmitted and received.

Time Diversity

A form of diversity is temporal diversity to decrease the outage probability. While repetition coding is an example of time-diversity, any uncorrelated channels can be used to re-transmit information. For example, a sometimes-used method is subcarrier intensity modulation (SIM) whereby different subcarriers of an intensity-modulated signal are used to transmit independent data streams. In one implementation, the same information, but time-delayed, is transmitted on each subcarrier.

Spatial Diversity

Spatial diversity techniques often leverage the spatial decorrelation of the atmosphere to reduce the likelihood of an outage and increase the BER. Various implementations use one or multiple transmit apertures focused onto one or multiple receiver apertures in either the near-field or far-field. Without loss of generality, we consider receiver diversity schemes, though the methods can also be used for a combination of receiver and transmitter diversity schemes.

If multiple copies of the transmitted optical signal are received, then the information can be gathered and processed to determine the original signal. Some common methods are: maximal ratio combining (MRC), equal gain combining (EGC), or selective combining (SC). Transmitter and receiver methods may use multiple separate apertures or utilize a single aperture that can transmit or receive multiple spatial modes, such as coupling into few-mode fiber. These methods can be used with both coherent optical links as well as optical links based on direct detection. The methods are described briefly below:

- MRC: The received signals are combined optimally to maximize the desired metric, often SNR. If there are amplifying elements in the receiver combining architecture, the noise from those sources, as well as other noise sources, are estimated and used for the MRC algorithm.
- EGC: Each of the received signals is amplified to a similar value and either coherently or incoherent combined, depending on the detection method. Generally, EGC underperforms MRC.
- SC: The received signal with either the highest power or highest SNR is selected from all of the receivers and all other receiver outputs are ignored. Easiest to implement but lower performance.

Coherent and Noncoherent Combining

The above methods can be done in either the optical domain or the electrical domain. If the signals are combined in the optical domain, they are typically combined with interferometric devices, either concatenated Mach-Zehnder (MZ) modulators, or meshes of MZ modulators, whose relative path length differences are adjusted to align the phase of one or more received optical signals. In recent years there have been several theoretical and experimental studies of optical phase alignment algorithms for spatial diversity receivers.

Similarly, phase alignment can also occur in the electrical domain after the optical signals have been down converted. There is often more flexibility in the digital domain and FSO spatially diverse receivers have been demonstrated for both coherent and noncoherent detection methods. One downside of digital combining is that the number of independent receivers scales with the number of receiver apertures, which may or may not increase cost and complexity.

Wavelength Diversity

Like other diversity techniques, multiple wavelengths can transmit identical or similar information and traverse a unique or shared path. If the path length is long enough, then a shared path through the atmosphere can introduce decorrelation between optical wavelengths. This effect has been studied via two-frequency mutual coherence functions. Interestingly, only for very long links, such as LEO-to-ground, and high optical turbulence, can two frequencies transmitted and received through the same aperture become significantly decorrelated. For this reason, many previous wavelength diversity systems use optical wavelengths very far apart, such as 800 nm and 1550 nm to ensure decorrelation. Demonstrations of wavelength diversity have been shown for both direct detection and coherent detection-based systems where the wavelengths are separated by wavelength-selective devices, processed by separate receivers, and optimally combined. Some implementations rely on coding across multiple wavelengths of a wavelength-division multiplexed channel.

BRIEF DESCRIPTION OF THE DRAWINGS

Reference will now be made to the accompanying drawings, which are not necessarily drawn to scale, and wherein.

DETAILED DESCRIPTION

Figure 1:
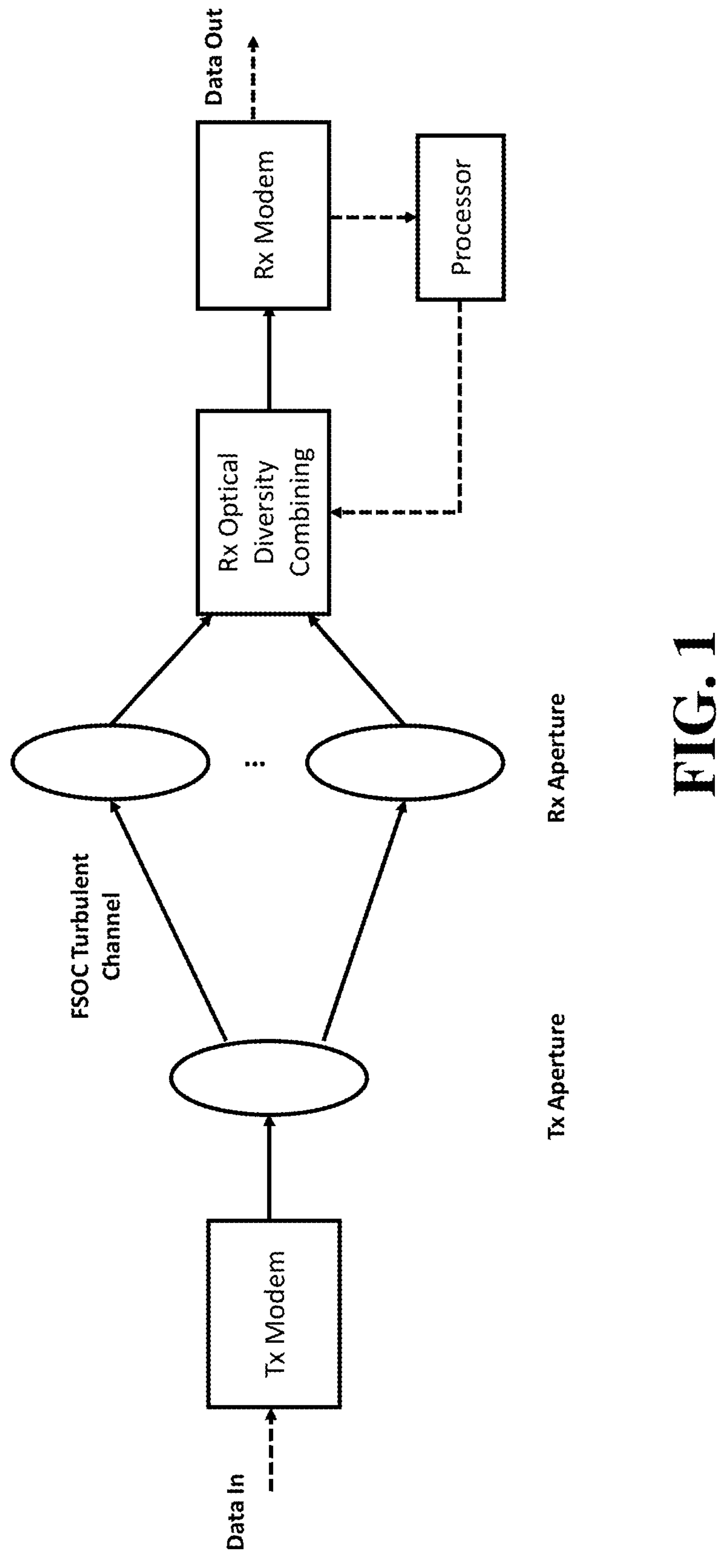
FIG. 1 is a block diagram illustrating an exemplary, non-limiting embodiment of a Unidirectional Single-Carrier Receiver Spatial Diversity in accordance with various aspects described herein.

Due to atmospheric fading, free-space optical communications links can experience power drops for long periods on the scale of communications systems (100 microseconds to 10 milliseconds). The architectures below are intended to mitigate the effect of atmospheric fading using spatial diversity and other diversity techniques. Importantly, these techniques may be used together or separately to completely resolve or partially mitigate the effects of atmospheric turbulence. In the cases where atmospheric effects can be completely mitigated, real-time optical links can be implemented without additional ARQ layers.

Here we outline architectures that enable spatial diversity in unique ways. The main application areas are by utilizing only a single transmitter and receiver modem for communications but exploiting multiple spatial paths to ensure diversity. In the remainder of the document, spatial paths are primarily shown as systems that have distinct transmitter or receiver apertures, but depending on the optical link, the multiple spatial paths could be achieved with a single aperture coupled into a multi-mode fiber or single-mode fiber. These architectures could also use a photonic lantern for spatial mode demultiplexing.

Embodiments of the Subject Disclosure

One or more aspects of the subject disclosure include a non-transitory, machine-readable medium, comprising executable instructions that, when executed by a processing system including a processor, facilitate performance of operations. The operations can include receiving, via one or more spatially distinct receivers, a plurality of transmitted optical signals associated with a spatially-diverse optical communication link, wherein the plurality of transmitted optical signals are generated based on a system configured for generating a first optical signal, generating a first electrical signal from multi-gigabit digital input data, modulating the first optical signal according to the first electrical signal to produce a second optical signal, directing the second optical signal to one or more spatially distinct transmitters coupled to a plurality of turbulent channels to produce the plurality of transmitted optical signals; forming a third optical signal based on a combination of the plurality of transmitted optical signals; converting the third optical signal to a second electrical signal; processing the second electrical signal to produce multi-gigabit digital output data, the multi-gigabit digital output data associated with the multi-gigabit digital input data; extracting one or more parameters from the second electrical signal; and controlling, based on the one or more parameters, the forming of the third optical signal, the converting of the third optical signal, the processing of the second electrical signal, the extracting of the one or more parameters, or any combinations thereof.

One or more aspects of the subject disclosure include the first optical signal, the second optical signal, third optical signal or combinations thereof being composed of one or more optical carriers. The first electrical signal can comprise a plurality of frequency-diverse symbol streams. The first optical signal can be generated with one or more lasers, a laser with electro-optic modulation, a laser coupled to a nonlinear medium, a mode locked laser, or combinations thereof. The modulating can occur in an optical modem. The modulating on each of the one or more optical carriers can be similar or identical to a remainder of the one or more optical carriers. The modulating can occur before the generating of the first optical signal. The forming of the third optical signal can utilize a phase alignment stage, the phase alignment stage being based on a mesh of Mach-Zehnder modulators, a phase aligned optical combiner, a photonic lantern, or combinations thereof. The controlling can be performed by a processor. The one or more spatially distinct transmitters can correspond to one or more transmitter apertures. The one or more transmitter apertures can have distinct spatial modes. The plurality of turbulent channels can correspond to a terrestrial optical link, a ground to low-earth orbit link, a space-to-space link, an underwater link, or combinations thereof. The first optical signal, the second optical signal, the third optical signal, or any combinations thereof can be time-delayed introducing time diversity with optical or electrical delay lines. The modulating of the one or more optical carriers, the processing of the second electrical signal, or both incur a time delay to introduce time-diversity, where the time delay is performed in an electrical domain with analog, digital electrical signals or both.

One or more aspects of the subject disclosure include the first optical signal, the second optical signal, or both being composed of multiple wavelengths to introduce wavelength diversity. The one or more spatially distinct receivers can correspond to one or more receiver apertures placed within or outside of a coherence length corresponding to the plurality of turbulent channels. The one or more receiver apertures can direct one or more spatial modes into one or more waveguides. The forming of the third optical signal can be performed via an adaptive optics system before being received by the one or more spatially distinct receivers. The adaptive optics system can utilize a deformable mirror or spatial light modulator with a plurality of special elements controlled by the one or more parameters. The one or more spatially distinct receivers are wavelength-diverse. The first optical signal, the second optical signal, third optical signal or combinations thereof can be filtered before the directing of the second optical signal. The combination of the plurality of transmitted optical signals can be performed according to equal gain combining, selective combining, maximal ratio combining, or combinations thereof. The forming can utilize optical taps with associated detectors that are applied before, within or after the phase alignment stage. One or more input ports, one or more output ports, or a combination thereof of the phase alignment stage can be blocked to ensure no output leakage. The second electrical signal can be digital, analog, or a combination thereof. The converting to the second electrical signal can include mixing the third optical signal with a fourth optical signal. The receiving, the forming, the converting, the processing, the extracting, the controlling, or any combinations thereof can be performed according to dithering, pilot tones, pilot symbols, or combinations thereof. The spatially-diverse optical communication link can be a bidirectional link. The directing the second optical signal can be performed in a similar manner to the forming of the third optical signal. The one or more parameters can be utilized for controlling the directing of the second optical signal or the forming of the third optical signal in either direction of a bidirectional link.

One or more aspects of the subject disclosure include a method for receiving, via one or more spatially distinct receivers, a plurality of transmitted optical signals associated with a spatially-diverse optical communication link, wherein the plurality of transmitted optical signals are generated based on a system configured for generating a first optical signal, generating a first electrical signal from multi-gigabit digital input data, modulating the first optical signal according to the first electrical signal to produce a second optical signal, directing the second optical signal to one or more spatially distinct transmitters coupled to a plurality of turbulent channels to produce the plurality of transmitted optical signals; forming a third optical signal based on a combination of the plurality of transmitted optical signals; converting the third optical signal to a second electrical signal; processing the second electrical signal to produce multi-gigabit digital output data, the multi-gigabit digital output data associated with the multi-gigabit digital input data; extracting one or more parameters from the second electrical signal; and controlling, based on the one or more parameters, the forming of the third optical signal, the converting of the third optical signal, the processing of the second electrical signal, the extracting of the one or more parameters, or any combinations thereof.

One or more aspects of the subject disclosure include an apparatus that includes a processing system including a processor; and a memory that stores executable instructions that, when executed by the processing system, facilitate performance of operations. The operations can include receiving, via one or more spatially distinct receivers, a plurality of transmitted optical signals associated with a spatially-diverse optical communication link, wherein the plurality of transmitted optical signals are generated based on a system configured for generating a first optical signal, generating a first electrical signal from multi-gigabit digital input data, modulating the first optical signal according to the first electrical signal to produce a second optical signal, directing the second optical signal to one or more spatially distinct transmitters coupled to a plurality of turbulent channels to produce the plurality of transmitted optical signals; forming a third optical signal based on a combination of the plurality of transmitted optical signals; converting the third optical signal to a second electrical signal; processing the second electrical signal to produce multi-gigabit digital output data, the multi-gigabit digital output data associated with the multi-gigabit digital input data; extracting one or more parameters from the second electrical signal; and controlling, based on the one or more parameters, the forming of the third optical signal, the converting of the third optical signal, the processing of the second electrical signal, the extracting of the one or more parameters, or any combinations thereof.

Single-Carrier Spatial Diversity Architectures

Receiver-Diversity Architectures

FIG. 1 shows an optical link architecture that employs optical combining on the receiver side to support spatial diversity. Each of the apertures are transmitted across uncorrelated or partially correlated paths and are collected by separate receiver apertures. The light from these apertures are then combined in an optical combiner, discussed later, with feedback from a processor. The combined light, which is more tolerant to turbulence due to spatial diversity is then processed by the receiver modem.

Figure 2:
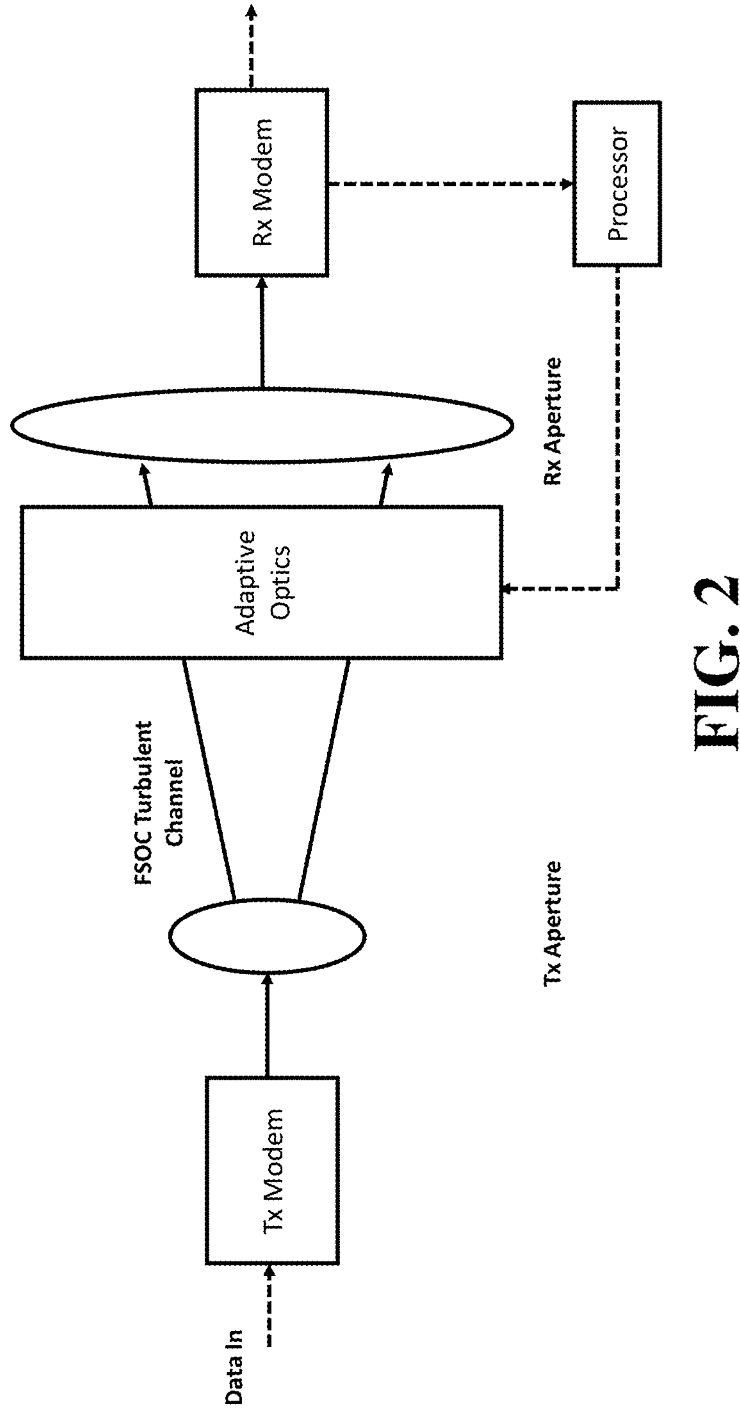
FIG. 2 is a block diagram illustrating an exemplary, non-limiting embodiment of a Unidirectional Single-Carrier Receiver Spatial Diversity with Adaptive Optics in accordance with various aspects described herein.

FIG. 2 shows a similar optical link architecture where the optical combining occurs in free-space with techniques commonly used in the field of adaptive optics. Here the feedback from the processor is sent to the adaptive optics system. This system may be composed of a deformable mirror or spatial light modulator, where the goal is to correct the wavefront of the optical field before it is focused into the waveguide. Typically, adaptive optics systems detect the wavefront optically, such as with a Shack-Hartmann sensor, and then uses that as a feedback mechanism for wavefront correction, via phase or amplitude variation. In this configuration, the feedback may be "blind" in the sense that the processor input to the adaptive optics system is based on a set of heuristics from the modem (such as SNR) that guide variations in the AO system. In other words, the processor algorithm used to adapt the wavefront, which changes over time, can be based on optimization of one or a few cost functions, which may coincide with an undetermined system.

This system may also be used in a configuration where the adaptive optics system inserts additional information into the optical field. One example would be to tag spatial locations with fixed or varying dithers, which can be extracted in the modem. By analyzing the phase and amplitude of the dithers over time, the processor can tune the phase and amplitude to optimize the collection efficiency and signal quality. In this case, the system may be undetermined or overdetermined.

One application of this system is to implement a wavefront-correcting system without wavefront sensing, reducing overall system cost and complexity. Another application is the determination of fluctuations in atmospheric parameters (atmospheric sensing). This information could be exported from the processor as well.

Transmitter-Diversity Architectures

Figure 3:
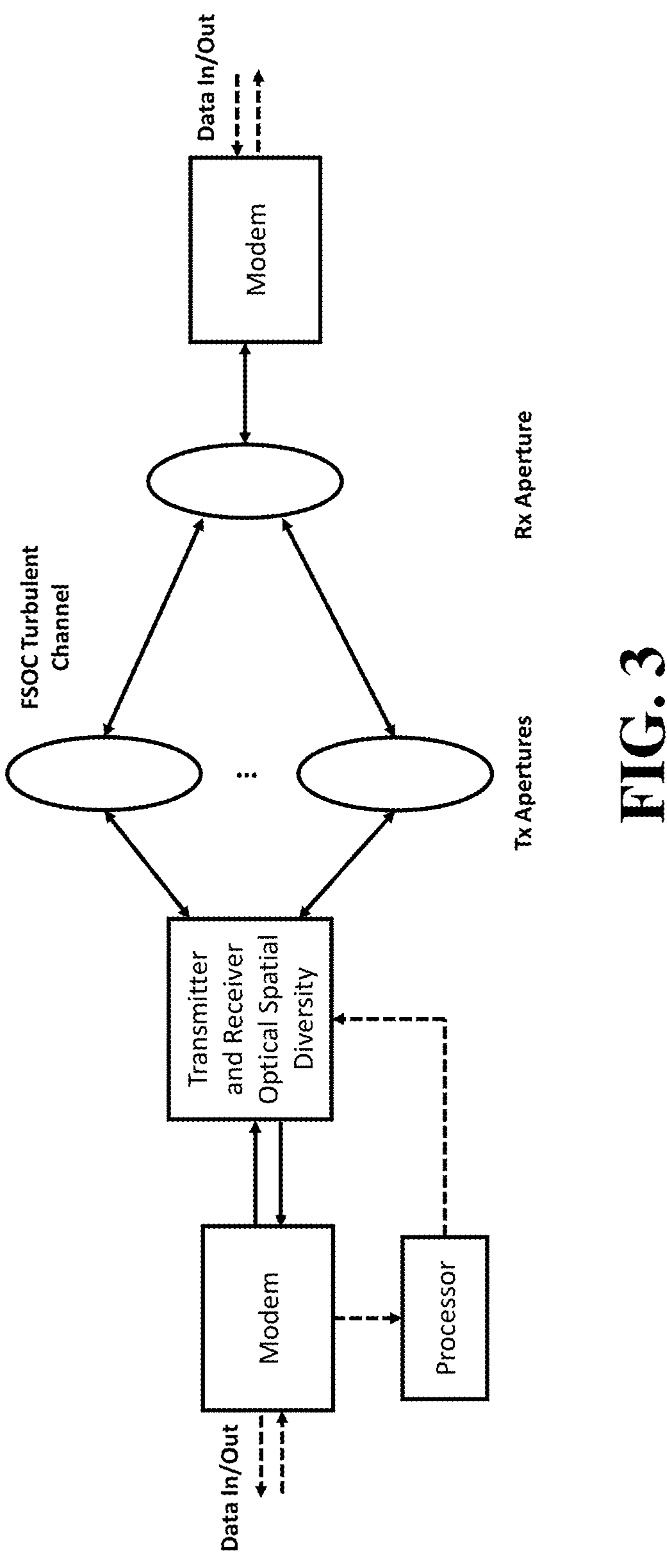
FIG. 3 is a block diagram illustrating an exemplary, non-limiting embodiment of a Bidirectional Single-Carrier Spatial Diversity With Modem Feedback in accordance with various aspects described herein.

FIG. 3 shows an optical link architecture that uses transmitter and receiver diversity in a bidirectional link configuration. The receiver spatial diversity may be accomplished with the techniques in the above section. The transmitter spatial diversity can be accomplished in the same optical splitter/combiner or in a different system. These options are outlined later on. The processor may use information from the received signal quality to improve the transmitter spatial diversity. For example, information from the received optical field may be used to transmit in lower-loss spatial modes. Additionally, information gathered from the received optical field may be used to determine beam wander, which could be corrected with transmit diversity. The received optical signals may traverse the same or different optical paths as the transmitted signals. This system may be used along with optical phase conjugation to improve tolerance to atmospheric effects. Finally, the techniques of the above two sections may be combined.

Multi-Carrier Spatial Diversity Architectures

The previous architectures focused on utilizing spatial diversity for turbulence mitigation at a single wavelength with a single optical carrier. Here we define a multi-carrier optical system as a system that transmits and receives information on multiple frequencies in the same modem, with optical detection of the multiple carriers happening in the same receiver. A multiple-wavelength system, conversely, would utilize multiple receivers to detect the transmitted signals. While multi-wavelength systems employing spatial diversity have been covered in some literature, multi-carrier systems have not been well-studied with spatial diversity.

Receiver-Diversity Architectures

Figure 4:
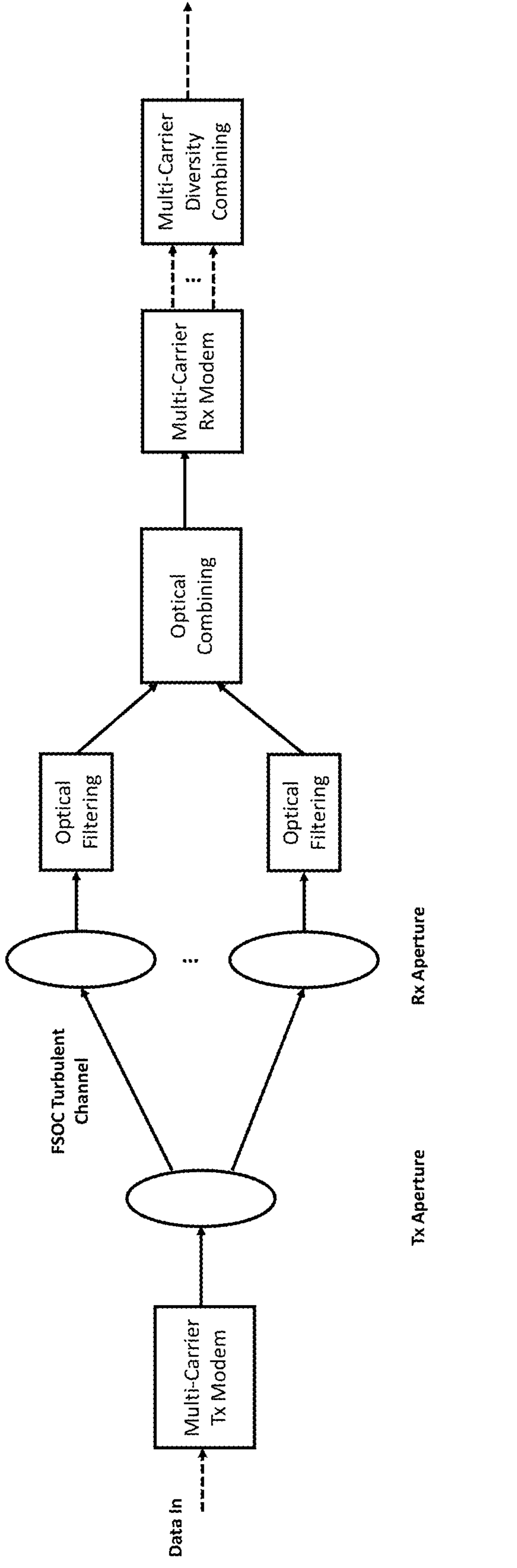
FIG. 4 is a block diagram illustrating an exemplary, non-limiting embodiment of a Unidirectional Multi-Carrier Receiver Spatial Diversity with Optical Filtering and Electrical Diversity Combining in accordance with various aspects described herein.

Receiver diversity can be accomplished by multi-carrier electrical diversity combining. FIG. 4 demonstrates an optical link architecture that uses receiver spatial diversity. A multi-carrier optical signal, composed of carriers with similar or identical information, is transmitted through a single transmitter aperture and received by multiple receiver apertures after propagation through turbulent atmosphere. Each of the receiver apertures is followed by a narrow optical filter that rejects all but the desired carrier. These carriers are then combined with a passive optical combiner and fed to a multi-carrier rx modem. The carriers are processed, resulting in electrical signals either in the digital or analog domain. These carriers are then combined via a diversity combination method and then the resulting data is output.

Figure 5:
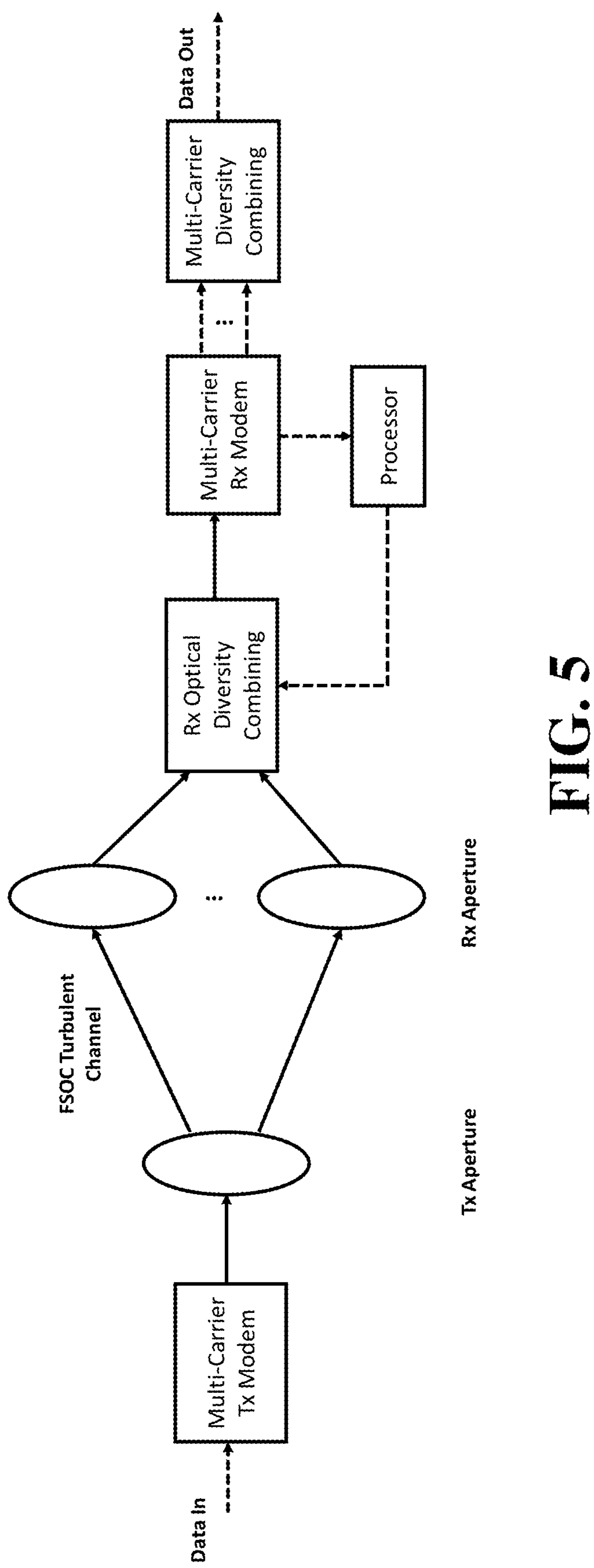
FIG. 5 is a block diagram illustrating an exemplary, non-limiting embodiment of a Unidirectional Multi-Carrier Receiver Spatial Diversity with Optical and Electrical Diversity Combining in accordance with various aspects described herein.

Receiver diversity can also be achieved by a combination of optical and electrical techniques. FIG. 5 demonstrates an optical link architecture using both techniques. After the multi-carrier optical signal is received in multiple receiver apertures, it undergoes optical diversity combining, as described later, to combine the optical signal into a single waveguide. This may be accomplished by any of the receiver diversity techniques in the previous section. Then the optical signals are processed in a multi-carrier modem and combined further electrically similar to FIG. 4.

Transmitter-Diversity Architectures

Figure 6:
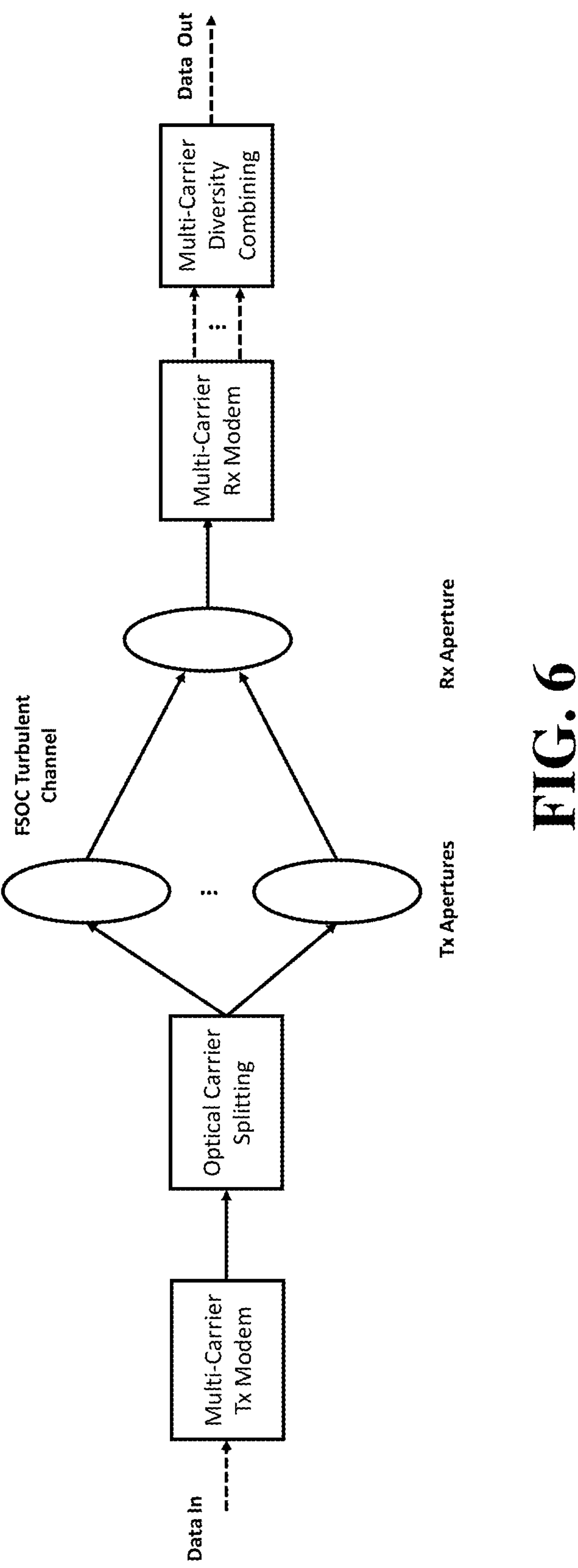
FIG. 6 is a block diagram illustrating an exemplary, non-limiting embodiment of a Unidirectional Multi-Carrier Transmitter Spatial Diversity With Electrical Diversity Combining in accordance with various aspects described herein.

Multi-carrier architectures can also be used for transmitter spatial diversity. FIG. 6 shows a transmitter diversity architecture that first generates a multi-carrier optical signal with similar or identical information on each of the subcarriers. Then that optical signal is sharply optically filtered to spatially separate each of the subcarriers. These subcarriers are routed to separate apertures (or generally separate spatial transmission modes) and then transmitted to the turbulent channel. After reception with a single aperture, the multi-carrier signal is received and processed with electrical diversity combining techniques as in FIGS. 4 and 5.

Figure 7:
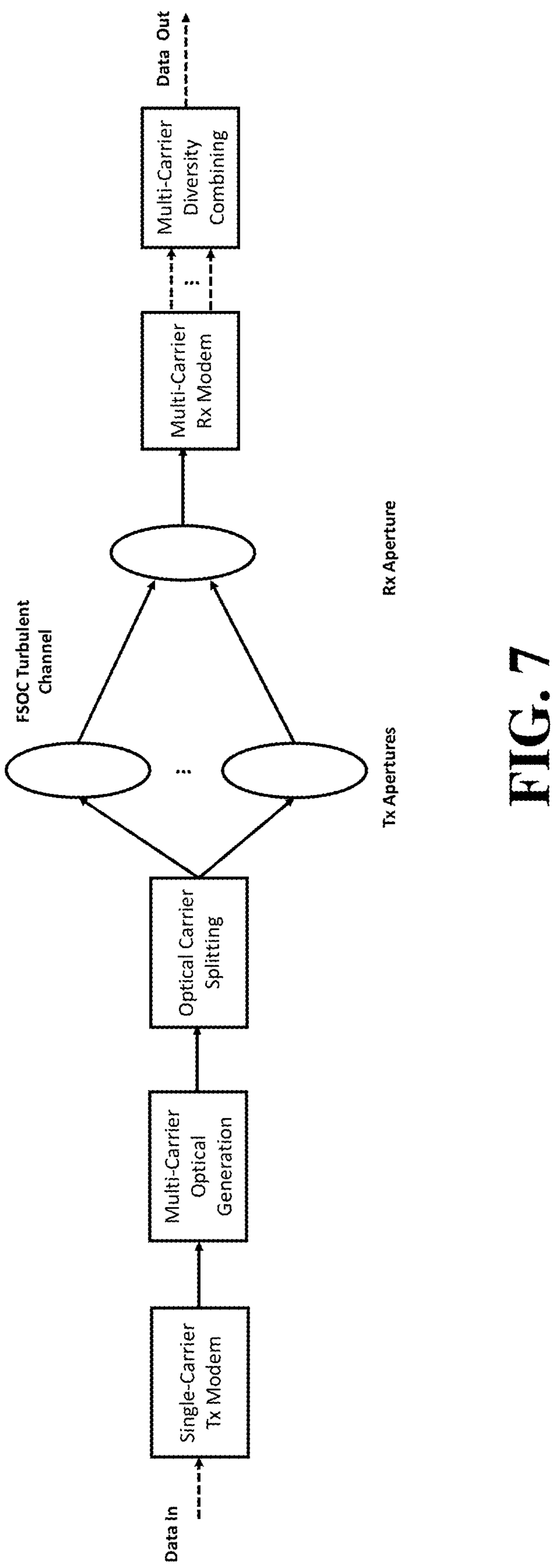
FIG. 7 is a block diagram illustrating an exemplary, non-limiting embodiment of a Unidirectional Multi-Carrier Transmitter Spatial Diversity With Single-Carrier Transmitter and Electrical Diversity Combining in accordance with various aspects described herein.

Multi-carrier transmitter spatial diversity can also be achieved with a single-carrier transmitter modem. FIG. 7 shows an optical architecture similar to FIG. 6, where instead of a multi-carrier transmitter modem, a single carrier modem generates an optical signal. This optical signal then undergoes multi-carrier generation. In this case, this could be performed via optical nonlinearities such as electro-optic modulation or Kerr generation. The multiple optical signals are then optically split and routed to separate transmitter apertures. Notably, the optical splitting could also occur before the multi-carrier generation.

Figure 8:
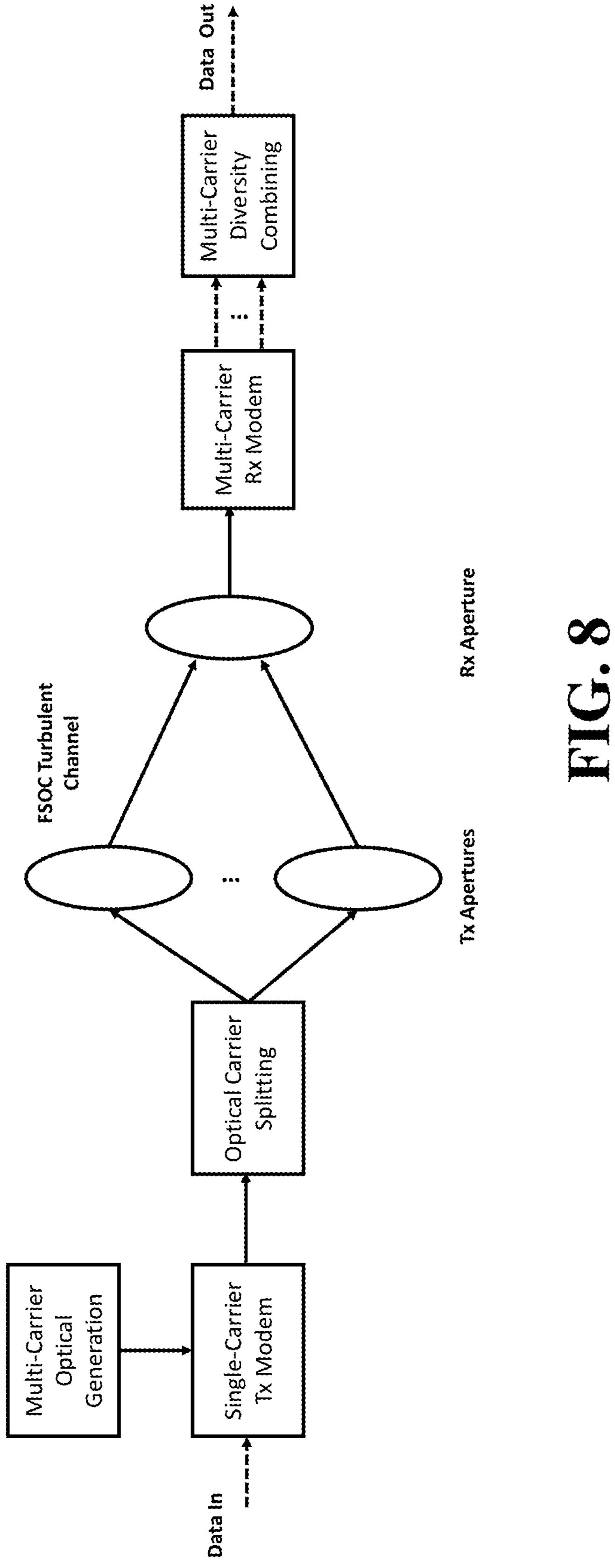
FIG. 8 is a block diagram illustrating an exemplary, non-limiting embodiment of a Unidirectional Multi-Carrier Transmitter Spatial Diversity With Single-Carrier Transmitter and Electrical Diversity Combining in accordance with various aspects described herein.

Another architectural option is shown in FIG. 8, where a multi-carrier optical signal is input to a single-carrier modem. This optical signal may be generated by an optical frequency comb, separate lasers, a single modulated laser, or other optical generation techniques. The single-carrier modem then modulates the carriers with the same or similar information before being sent to the optical splitting stage and separate transmitter apertures.

Optical Splitting and Combining Architectures

As shown in previous figures, optical splitting and combining, with feedback from a processor is central to many of the above designs. Here we outline a few options for optical splitting and combining. In the following, the optical splitting and combining is shown as being performed in waveguides combined in a Mach-Zehnder mesh configuration. While this a compact, high-performance implementation, these techniques can be combined generally by an arbitrary mode converter with phase shifters, or various other implementations.

Receiver Combining (M to 1)

Figure 9:
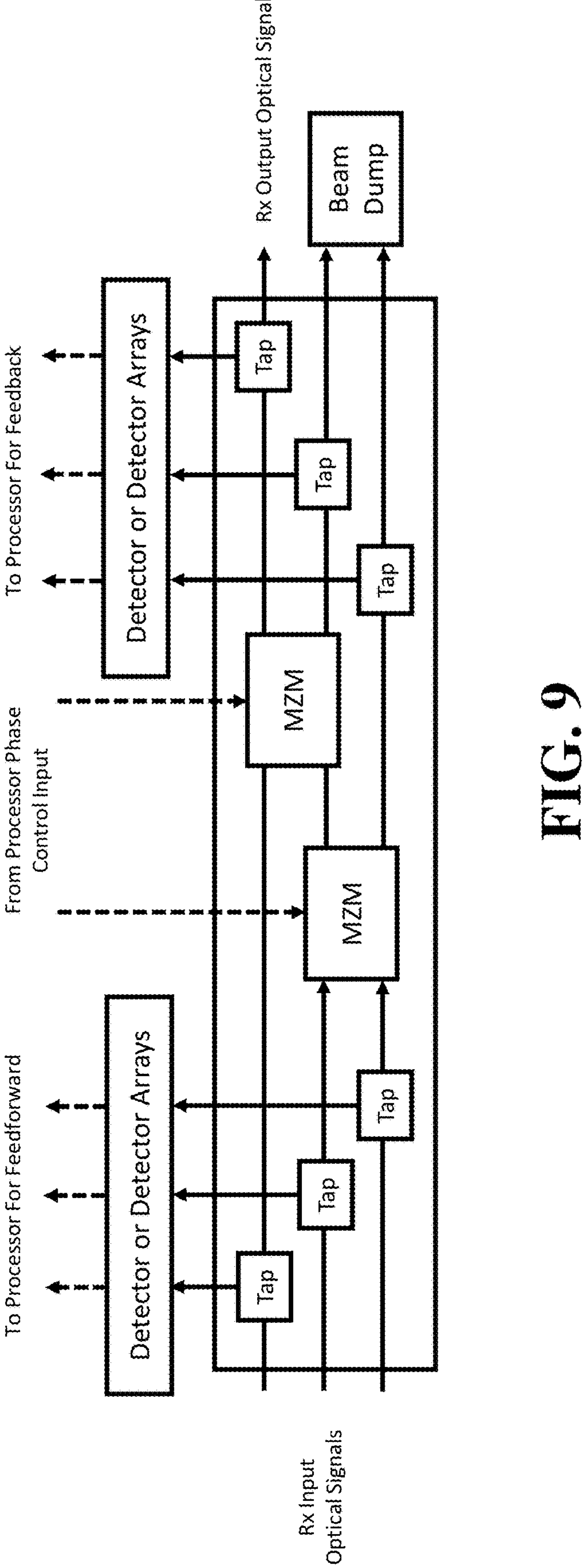
FIG. 9 is a block diagram illustrating an exemplary, non-limiting embodiment of a 3×1 Unidirectional Single-Output Receiver Optical Diversity Combiner in accordance with various aspects described herein.

FIG. 9 shows a device capable of taking M input optical signals and combining them to produce a single optical signal that is phase-aligned and ready for input to a receiver modem. The optical signals contain similar or identical information but have passed through partially correlated or uncorrelated spatial paths, meaning that their phases will not be aligned. The input optical signals may come from separate apertures or from a single aperture connected to a multimode fiber, which is then broken out to single mode waveguides via a photonic lantern. Initial taps in the detector array can be used for feed-forward processing sent to the processor. Power fluctuations could be identified and used in combination algorithms. The optical signals are then passed through a mesh of Mach-Zehnder modulators that adjust the relative phases of the incoming optical signals so that they are combined coherent in a single output waveguide. Taps after the Mach-Zehnder mesh can be used for feedback to the processor to ensure that the signals are being routed efficiently to the single output optical port.

Transmitter Splitting (1 to N)

Figure 10:
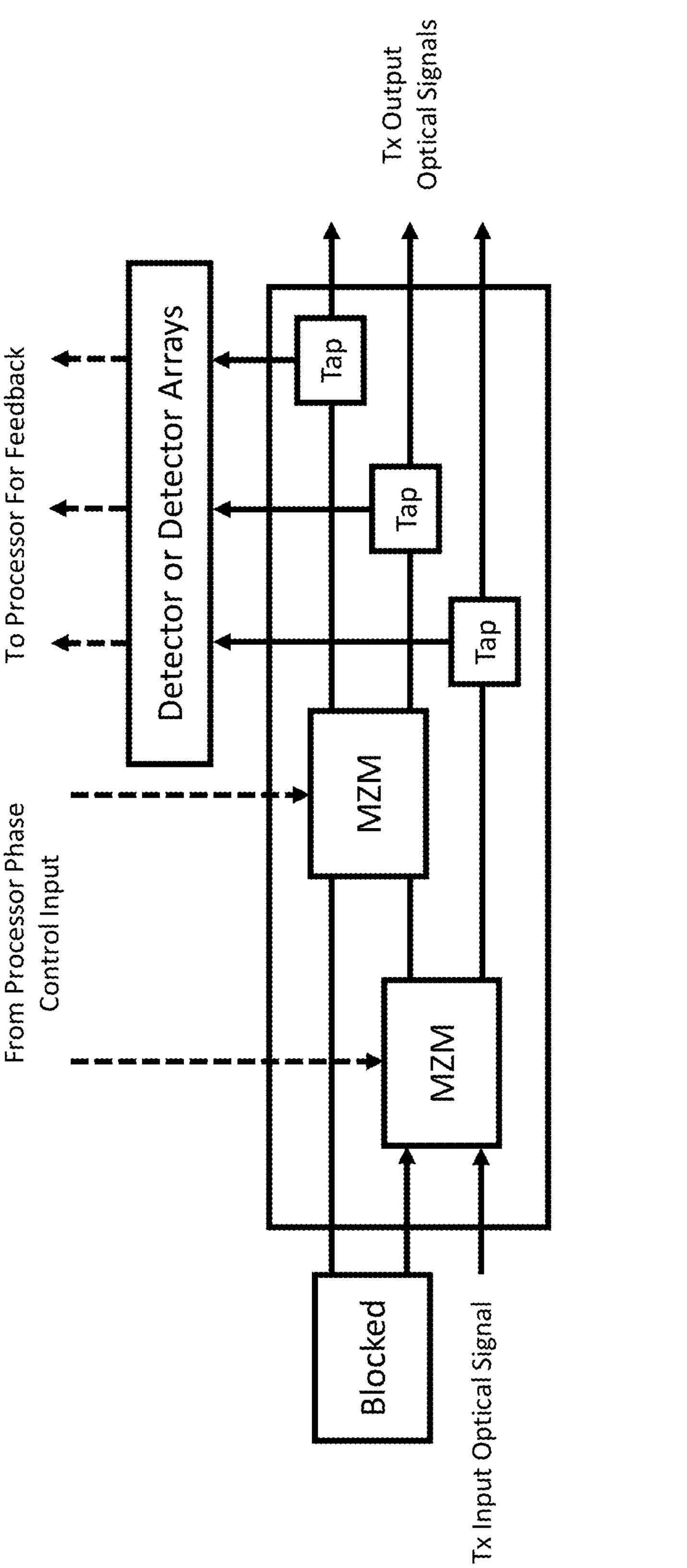
FIG. 10 is a block diagram illustrating an exemplary, non-limiting embodiment of a 1×3 Unidirectional Single-Output Transmitter Optical Diversity Combiner in accordance with various aspects described herein.

FIG. 10 shows a device composed of a Mach-Zehnder modulator mesh for transmitter spatial diversity. Generally, the above device generates N correlated signals from a single input optical signal by routing light to N separate ports. The output optical signals could be routed to separate transmitter apertures, to a photonic lantern for multi-mode transmission, or to another spatial diversity transmitter. The portion of the signals sent to each tap is determined by the slow-speed input signaling from the processor. The Mach-Zehnder modulators could be composed of electro-optic modulators, thermo-optic phase shifters, or other devices that can produce adjustable phase delays combined with optical waveguides. The optional detector taps can be used for calibration or for real-time decision-making.

Transmitter Splitting or Receiver Combining (M to N)

Figure 11:
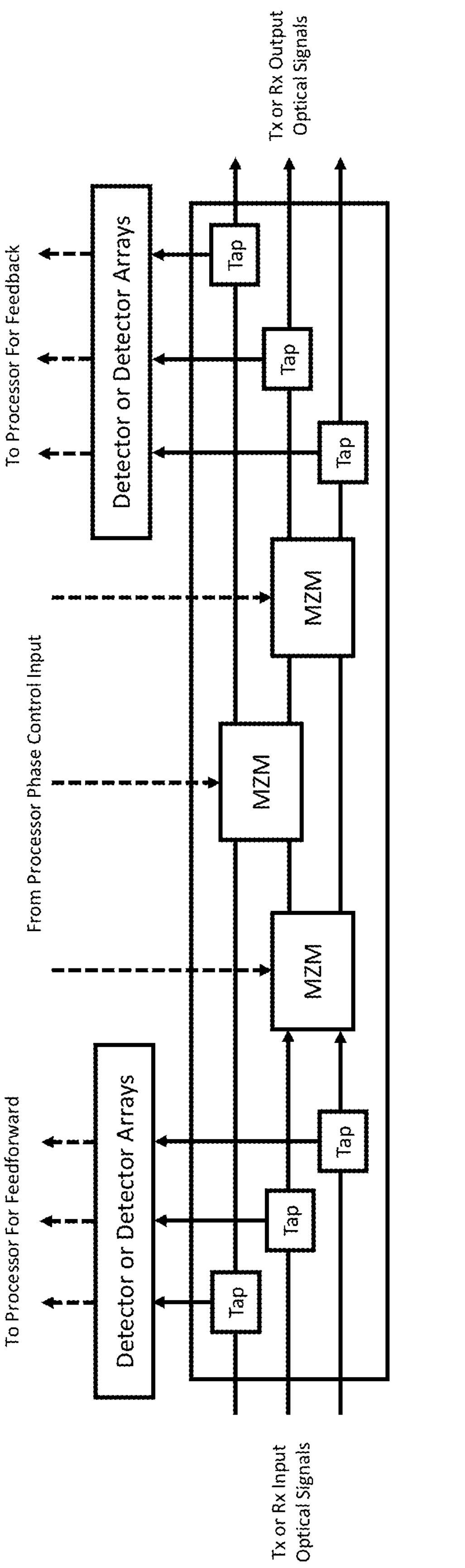
FIG. 11 is a block diagram illustrating an exemplary, non-limiting embodiment of a 3×3 Unidirectional Multiple-Output Transmitter or Receiver Optical Diversity Combiner in accordance with various aspects described herein.

In some cases, multiple input optical signals may be distributed to multiple output ports for transmitter diversity. This could happen to boost the transmitter optical power combined with optical amplifiers. Similarly, in some cases, multiple input optical ports may be distributed to several receiver optical outputs. This could happen in situations where correlated optical signals with different information are needed to be decorrelated. In these cases, an arbitrary optical mode splitter or combiner can be used such as shown in FIG. 11. Here a 3×3 case is shown with a Mach-Zehnder mesh with optical taps that export information to the processor. As in FIGS. 9 and 10, the processor controls the phase input to ensure that the desired output optical signal distribution occurs.

Bidirectional Transmitter Splitting and Receiver Combining

Figure 12:
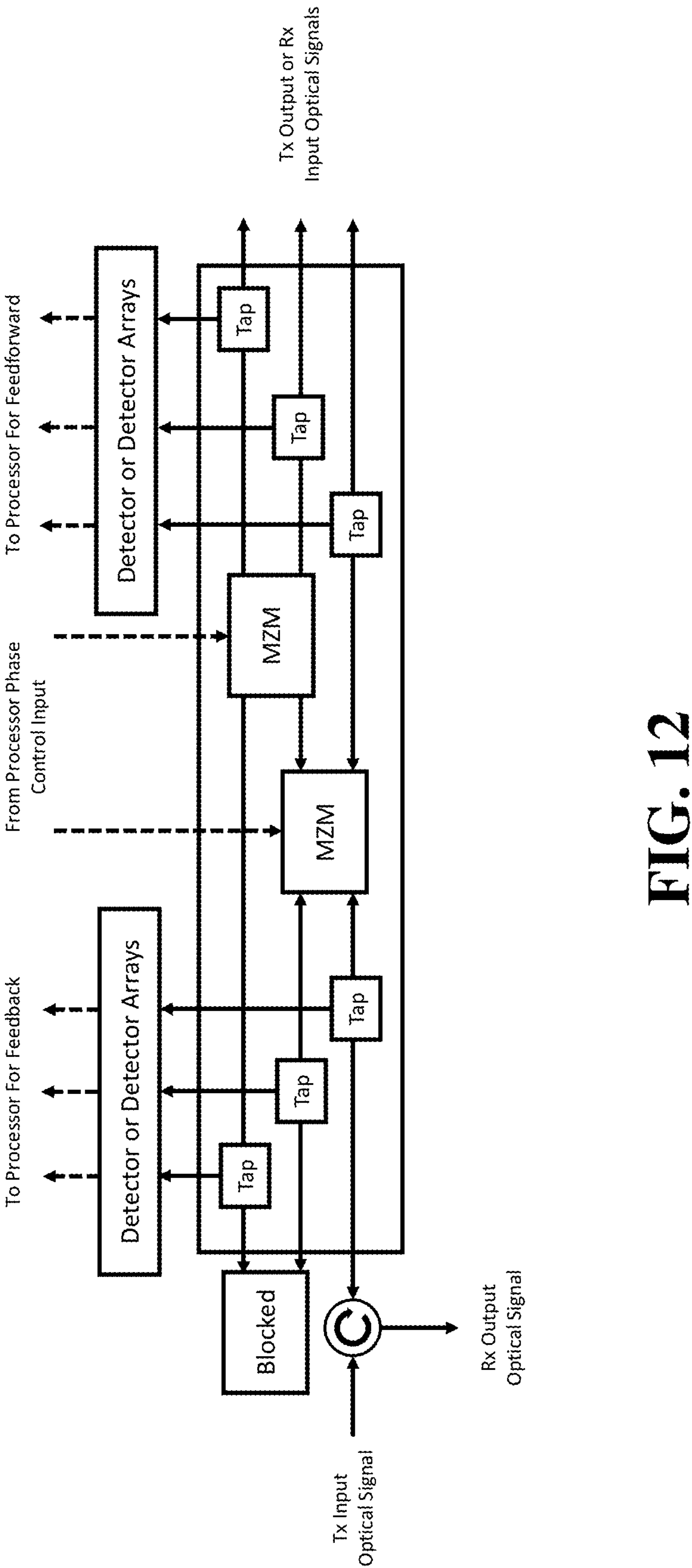
FIG. 12 is a block diagram illustrating an exemplary, non-limiting embodiment of a Bidirectional Transmitter or Receiver Optical Diversity Combiner in accordance with various aspects described herein.

FIG. 12 shows an optical combining and splitting architecture that re-uses the optical waveguides and Mach Zehnder modulator mesh from the receiver diversity combining for transmitter diversity splitting as well. A circulator is used to separate the transmitter output and receiver input optical signals.

Processor Control Signals

In FIGS. 9-12, control signals are sent to each Mach-Zehnder modulator to ensure that optimized combination or splitting of optical signals occurs. These control signals primarily adjust the phase in arms of the Mach-Zehnder modulators, leveraging interference between the nominally coherent signals. The determination of the controls can be accomplished in the processor via several mechanisms.

Diversity-Combining Feedback/Forward

Information from the optical diversity combiner or splitter can be exported to the processor in order to adjust the phase control input. This information can be obtained from optical taps located throughout the mesh. The optical taps provide information about the optical power located at various points and thus the efficiency of coherent combination or splitting. In a modulation-format agnostic method, low-speed dithers can be applied in the modulators, which can be detected via the optical taps. Alternatively, not shown, each input waveguide can also be modulated by a slow-speed dither, which can be detected by the optical taps.

Modem Feedback

The optical modem can also export information to the processor for efficient combination. Outlined in more detail in the final sections, the modem can export general heuristic information, such as SNR per carrier, or it can export symbols or samples to the processor. In the case of heuristics such as SNR, the modulators in the mesh can operate “blindly” based on various algorithms to optimize the coherent combination of the input optical signals. In these cases, the modulator phase can be controlled to optimize for a cost function tied to one of the heuristics (e.g. tune the phase modulators to optimize the SNR).

The modem can also detect markers inserted by the optical transmitter or combiner. For example, if a low-speed dither is applied by either the modulator mesh, external modulators before the mesh, or external modulators in the transmitter, the DSP can tag or identify separate contributions to the signals in the DSP, either in the analog or digital domain. These marker signals, which can be tones or dithers, can be analyzed for amplitude and phase and then exported to the processor to update the modulator phase control.

Finally, the modem can be controlled by addition of information in the transmitter. For example, pilot symbols can be inserted in the transmitter. The detection of these symbols in the receiver DSP can then be used to tune the phase control input to the receiver symbols.

Multi-Carrier Electrical Combining Architecture

Similar to the optical combining methods above, in the multi-carrier architectures of FIGS. 4-8, electrical carrier combining is performed. This combining can be performed in the analog domain with variable analog electrical delays or in the digital domain, where a buffer can be used to align samples or symbols to account for different propagation delays. Interpolation may be used in this case to align symbols on a sub-sample basis.

Processor Control Signals

Many of the same techniques as the optical combining case can be used to electrically combine the signals. Estimation of the noise per subcarrier, which can be done via typical DSP methods, or by the addition of tones, dithers, or pilot symbols, can allow for maximal ratio combining in either a specially modified ASIC or processor.

Modem Architecture

Figure 13:
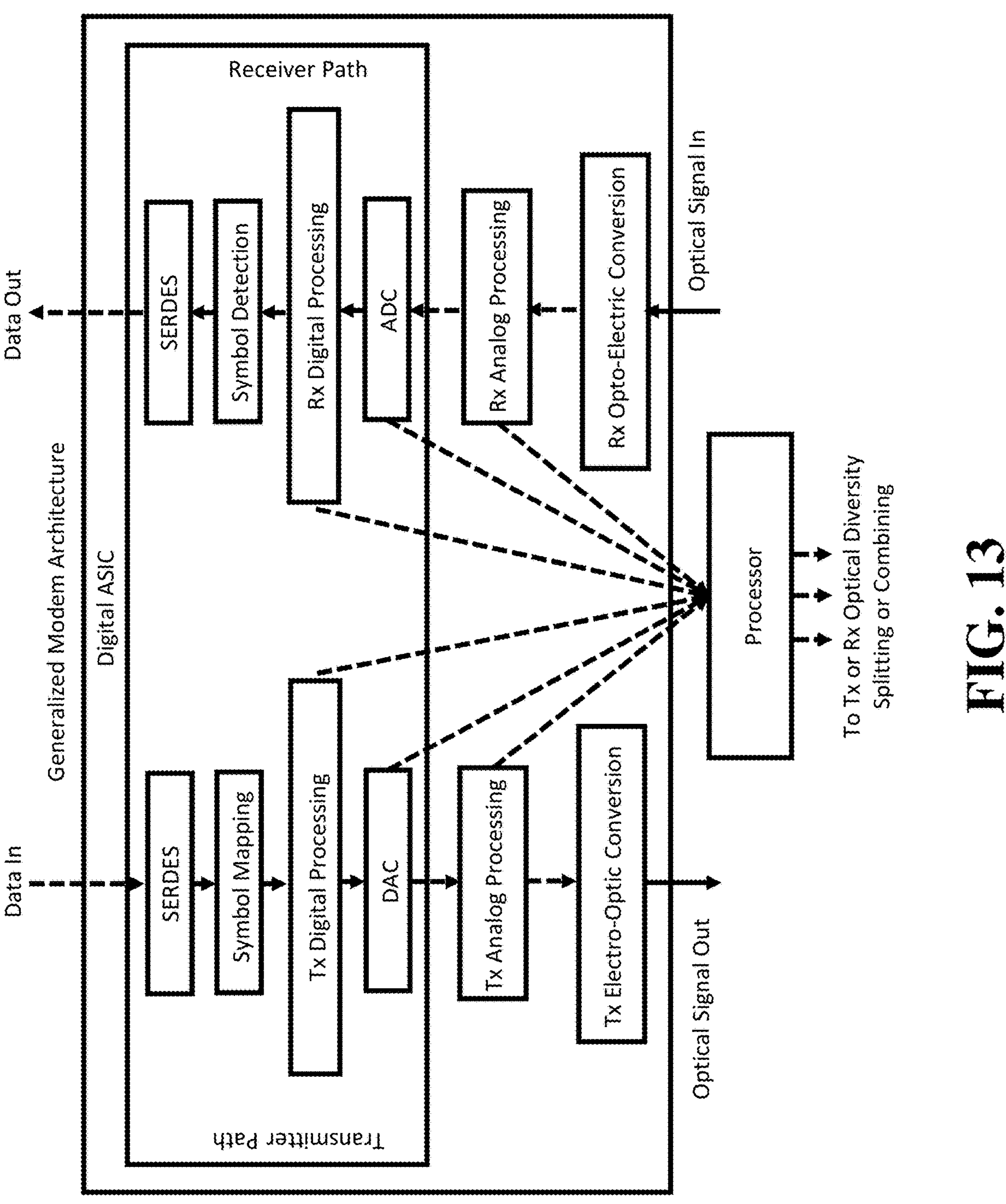
FIG. 13 is a block diagram illustrating an exemplary, non-limiting embodiment of a Single-Carrier Modem Architecture and Processor Supporting Spatial Diversity via Optical Splitting or Combining in accordance with various aspects described herein.

A general schematic of a modem is shown in FIG. 13. The modem architecture shown is for a typical bi-directional implementation, which is compatible with the FSOC architectures shown before, where only one of the paths is explicitly shown. The modem can use coherent or direct detection, though the signal flow for a coherent modem is shown in FIG. 13. Diagnostic information or raw samples are sent to a processor. On the processor, the streamed data can be processed to determine important diagnostic information for phase input to the optical diversity blocks. One example of a diagnostic that can be read is the signal-to-noise-ratio of a particular data stream.

Figure 14:
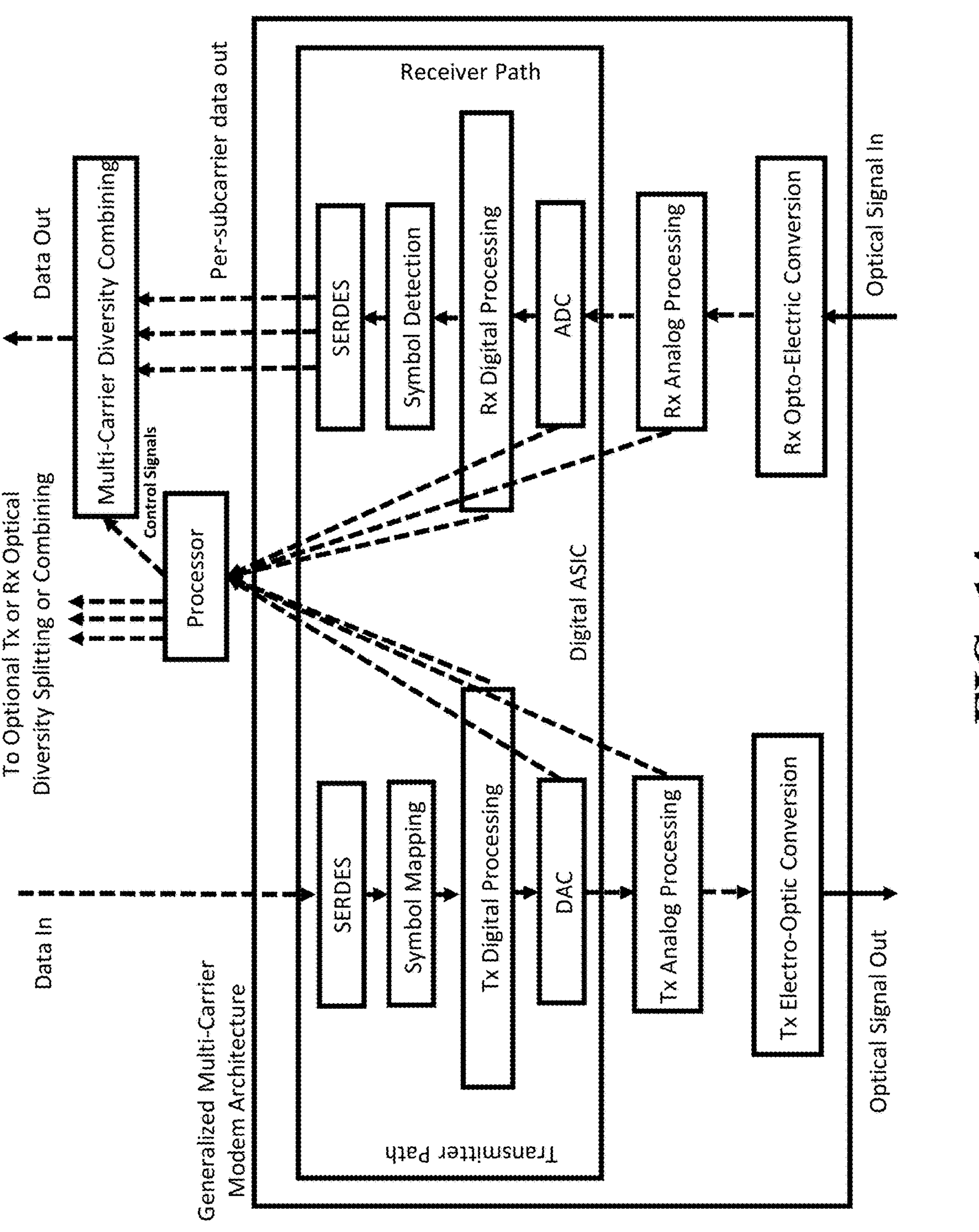
FIG. 14 is a block diagram illustrating an exemplary, non-limiting embodiment of a Multi-Carrier Modem Architecture and Processor Supporting Spatial Diversity via Optical Splitting/Combining and Multi-Carrier Diversity Combining in accordance with various aspects described herein.

FIG. 14 shows another modem design compatible with multi-carrier diversity combining. Here, information is sent to the processor in a similar manner to FIG. 13. The processor takes in per-subcarrier data and performs the electrical diversity combining. Although symbol detection is shown in the modem block, it is also possible to align the data on a per-sample basis before symbol detection, in which case symbol detection would be performed after the electrical alignment stage.

Combination with Other Diversity Techniques

The techniques here can also be combined with other turbulence mitigation techniques such as time diversity and wavelength diversity Time Diversity Time diversity can be accomplished either optically or electrically through the delay of identical or similar waveforms either electrically or optically. One example of this is by applying an optical delay line for separate wavelengths in the above architectures in both the transmitter and receiver. The optical delay line could be accomplished with spools of optical fiber and optical fiber amplifiers. By time-delaying signals that traverse the same turbulence, temporal correlation of the atmosphere can be mitigated. In simpler words, atmospheric fading events that happen on shorter time scales can be avoided by transmitting the same or similar information sequentially. In the digital domain, forward error correction can be used over multiple wavelengths to increase the tolerance to bit errors.

Wavelength Diversity

Many known techniques exist to mitigate the effects of atmospheric turbulence by utilizing uncorrelated or partially correlated optical wavelengths. For example, multiple modulated wavelengths can be used to reduce the likelihood of a time-correlated fading event. These techniques are compatible with the spatial diversity techniques presented here.

Figure 15:
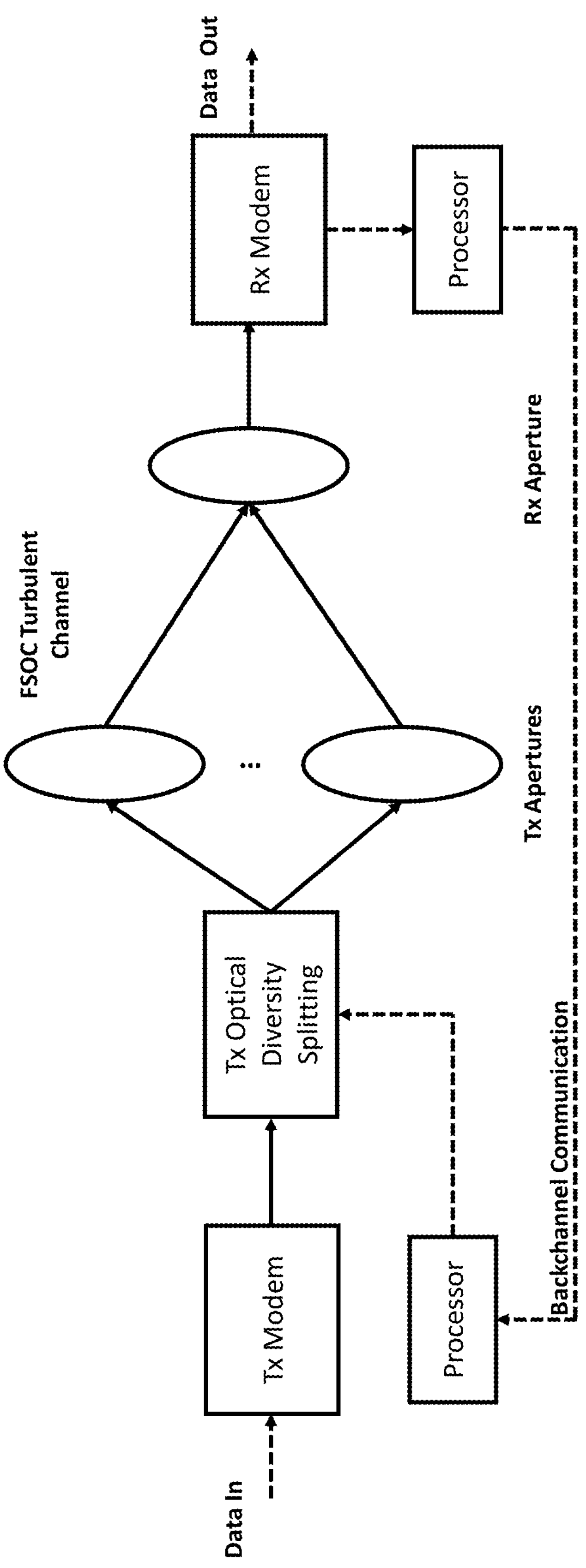
FIG. 15 is a block diagram illustrating an exemplary, non-limiting embodiment of a Unidirectional Single-Carrier Transmitter Spatial Diversity With Backchannel in accordance with various aspects described herein.

FIG. 15 is a block diagram illustrating an exemplary, non-limiting embodiment of a Unidirectional Single-Carrier Transmitter Spatial Diversity With Backchannel in accordance with various aspects described herein. In FIG. 15, an optical link architecture is shown where a backchannel link exists connecting two modems (transmitter and receiver) operating in unidirectional transmission. The receiver processor sends information about the turbulent channel to the transmitter processor that assists with the transmitter optical diversity splitting.

Figure 16:
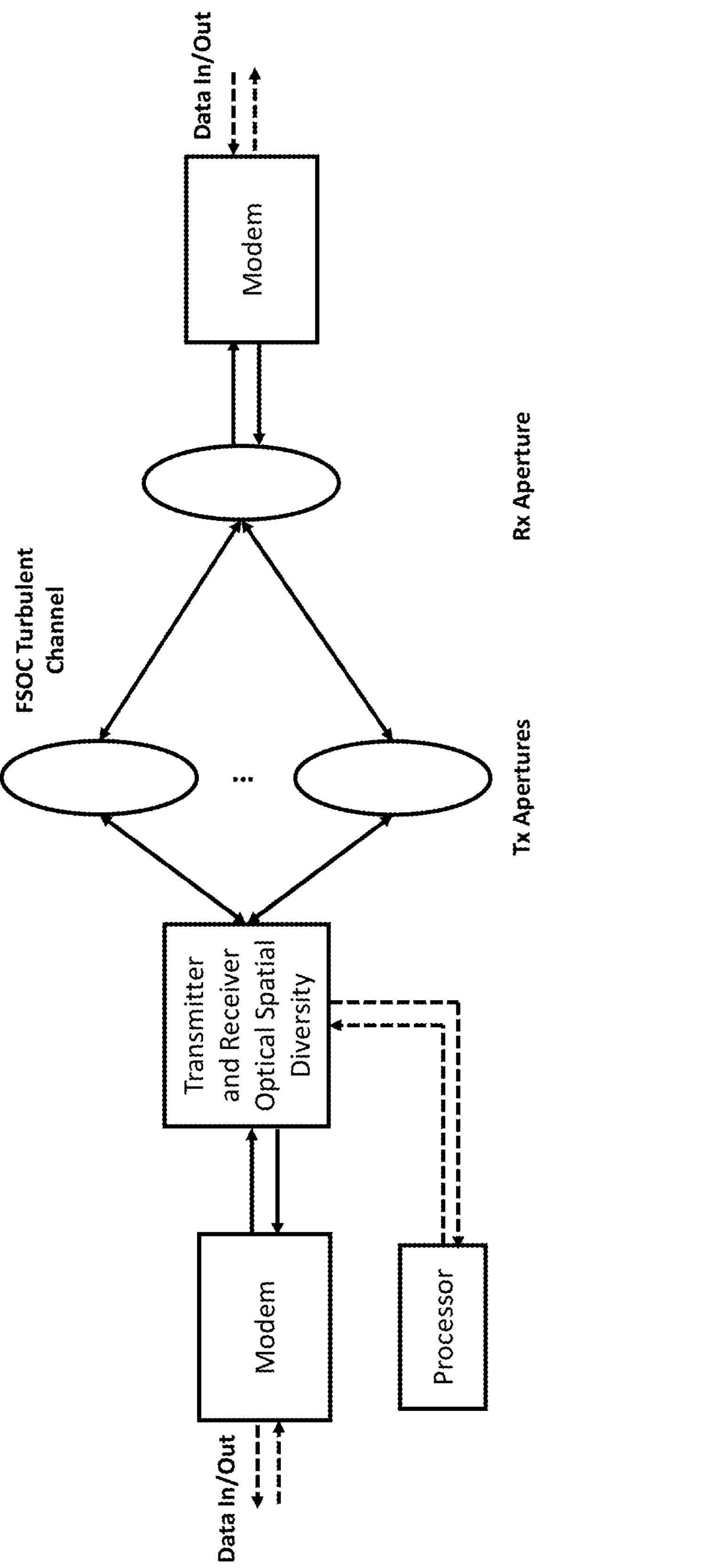
FIG. 16 is a block diagram illustrating an exemplary, non-limiting embodiment of a Bidirectional Single-Carrier Transmitter Spatial Diversity With Diversity Feedback in accordance with various aspects described herein.

FIG. 16 is a block diagram illustrating an exemplary, non-limiting embodiment of a Bidirectional Single-Carrier Transmitter Spatial Diversity With Diversity Feedback in accordance with various aspects described herein. In FIG. 16, an optical link architecture is shown where a single modem transmits and receives data through a co-located transmitter and receiver optical spatial diversity system. In this configuration, the receiver optical spatial diversity system assists the transmitter optical diversity system by sending information to the processor, where information about the turbulent channel is used to guide the transmitter optical spatial diversity system.

Figure 17:
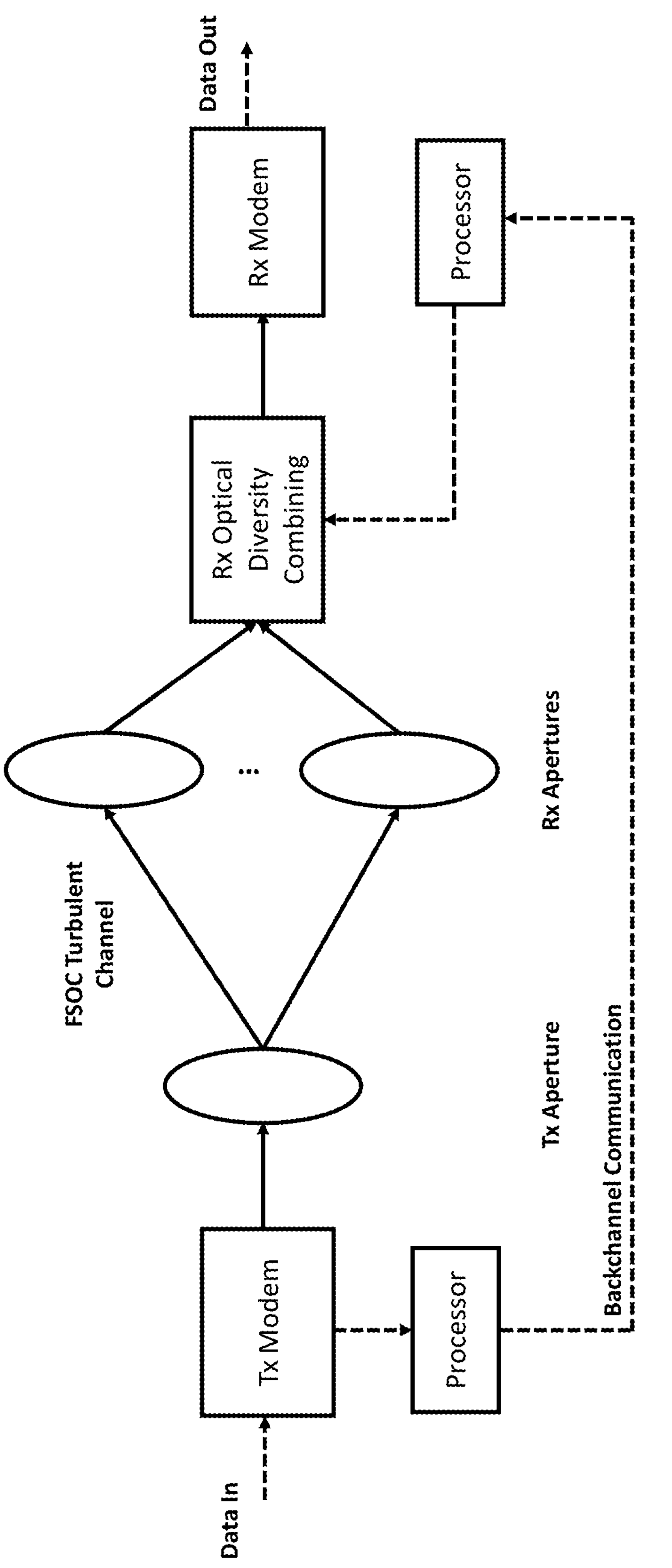
FIG. 17 is a block diagram illustrating an exemplary, non-limiting embodiment of a Unidirectional Single-Carrier Receiver Spatial Diversity with Backchannel in accordance with various aspects described herein.

FIG. 17 is a block diagram illustrating an exemplary, non-limiting embodiment of a Unidirectional Single-Carrier Receiver Spatial Diversity with Backchannel in accordance with various aspects described herein. In FIG. 17, an optical link architecture is shown where a backchannel link exists connecting two modems (transmitter and receiver) operating in unidirectional transmission. The transmitter processor sends information about the turbulent channel or about the transmitted data to the receiver processor that assists with the receiver optical diversity splitting.

Figure 18:
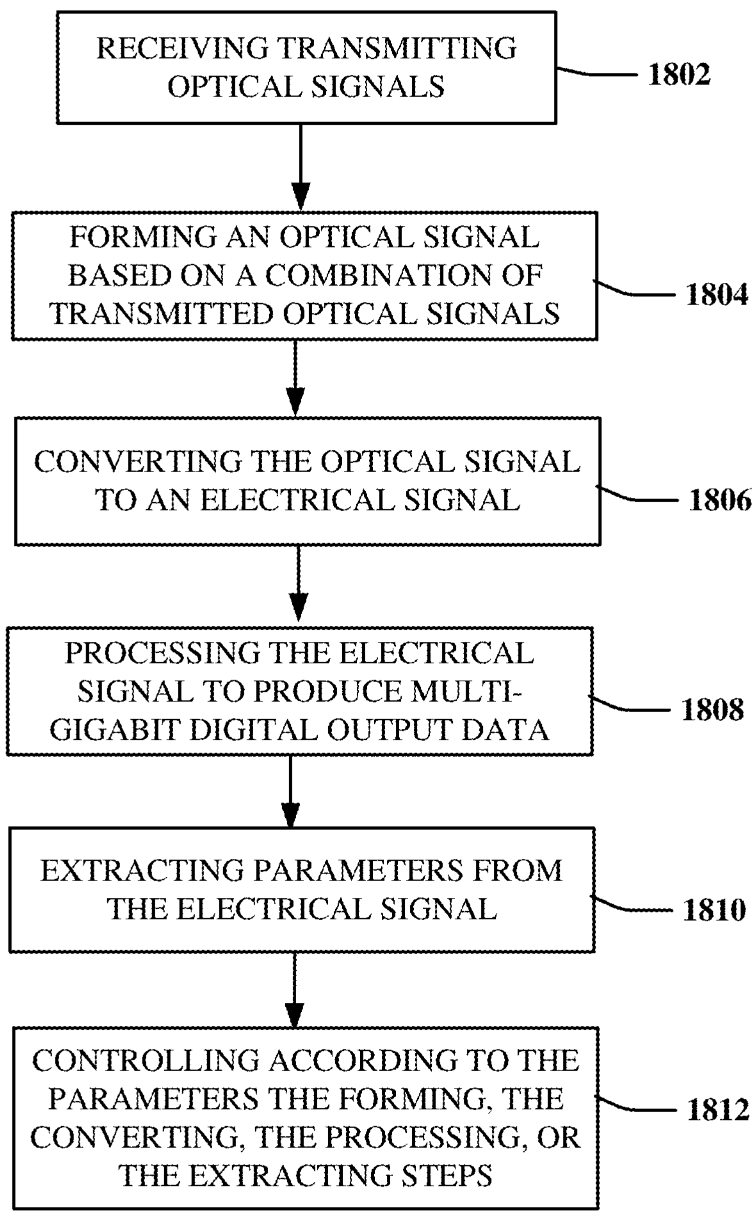
FIG. 18 depicts an illustrative embodiment of a method in accordance with various aspects described herein.

FIG. 18 depicts an illustrative embodiment of a method 1800 in accordance with various aspects described herein. Method 1800 can begin at step 1802 by receiving, via one or more spatially distinct receivers, a plurality of transmitted optical signals associated with a spatially-diverse optical communication link, wherein the plurality of transmitted optical signals are generated based on a system configured for generating a first optical signal, generating a first electrical signal from multi-gigabit digital input data, modulating the first optical signal according to the first electrical signal to produce a second optical signal, directing the second optical signal to one or more spatially distinct transmitters coupled to a plurality of turbulent channels to produce the plurality of transmitted optical signals. At step 1804 a third optical signal can be formed based on a combination of the plurality of transmitted optical signals. At step 1806 the third optical signal can be converted to a second electrical signal. At step 1808 the second electrical signal can be processed to produce multi-gigabit digital output data, the multi-gigabit digital output data associated with the multi-gigabit digital input data. At step 1810 one or more parameters can be extracted from the second electrical signal. Based on the one or more parameters, at step 1812 one or more combinations of the following steps can be controlled: the forming of the third optical signal, the converting of the third optical signal, the processing of the second electrical signal, and the extracting of the one or more parameters.

While for purposes of simplicity of explanation, the respective processes are shown and described as a series of blocks in FIG. 18, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

What is claimed is:

1. An apparatus, comprising:

a processing system including a processor; and a memory that stores executable instructions that, when executed by the processing system, facilitate performance of operations, comprising:

receiving, via one or more spatially distinct receivers, a plurality of transmitted optical signals associated with a spatially-diverse optical communication link, wherein the plurality of transmitted optical signals are generated based on a system configured for generating a first optical signal, generating a first electrical signal from multi-gigabit digital input data, modulating the first optical signal according to the first electrical signal to produce a second optical signal, directing the second optical signal to one or more spatially distinct transmitters coupled to a plurality of turbulent channels to produce the plurality of transmitted optical signals;

forming a third optical signal based on a combination of the plurality of transmitted optical signals;

converting the third optical signal to a second electrical signal;

processing the second electrical signal to produce multi-gigabit digital output data, the multi-gigabit digital output data associated with the multi-gigabit digital input data;

extracting one or more parameters from the second electrical signal; and controlling, based on the one or more parameters, the forming of the third optical signal, the converting of the third optical signal, the processing of the second electrical signal, the extracting of the one or more parameters, or any combinations thereof, wherein the forming of the third optical signal is performed according to equal gain combining, selective combining, maximal ratio combining, or combinations thereof.

2. The apparatus of claim 1, wherein the first optical signal, the second optical signal, the third optical signal, the first electrical signal, the second electrical signal or combinations thereof are composed of one or more carriers, wherein the modulating on each of the one or more carriers is similar or identical to a remainder of the one or more carriers, and wherein the modulating occurs in an optical modem.

3. The apparatus of claim 1, wherein the first electrical signal or the second electrical signal is digital, analog, or a combination thereof.

4. The apparatus of claim 1, wherein the first optical signal is generated with one or more lasers, a laser with electro-optic modulation, a laser coupled to a nonlinear medium, a mode locked laser, or combinations thereof.

5. The apparatus of claim 1, wherein the forming of the third optical signal utilizes a phase alignment stage, the phase alignment stage being based on a mesh of Mach-Zehnder modulators, a phase aligned optical combiner, a photonic lantern, or combinations thereof.

6. The apparatus of claim 5, wherein the forming utilizes one or more optical taps with associated detectors that are applied before, within or after the phase alignment stage, and wherein one or more input ports, one or more output ports, or a combination thereof of the phase alignment stage are blocked to ensure no output leakage.

7. The apparatus of claim 1, wherein the plurality of turbulent channels correspond to a ground to ground optical link, a ground to air link, a ground to space link, an air to air link, an air to space link, a space to space link, an underwater link, a link through bulk liquids or solids, or any combinations thereof.

8. The apparatus of claim 1, wherein the one or more spatially distinct transmitters correspond to one or more transmitter apertures, wherein the one or more transmitter apertures have one or more distinct spatial modes.

9. The apparatus of claim 1, wherein the one or more spatially distinct receivers correspond to one or more receiver apertures placed within or outside of a coherence length corresponding to the plurality of turbulent channels, wherein the one or more receiver apertures direct one or more distinct spatial modes into one or more waveguides.

10. The apparatus of claim 1, wherein the forming of the third optical signal is performed via an adaptive optics system before being received by the one or more spatially distinct receivers, and wherein the adaptive optics system utilizes a deformable mirror or spatial light modulator controlled by the one or more parameters.

11. The apparatus of claim 1, wherein the first optical signal, the second optical signal, the third optical signal, the first electrical signal, the second electrical signal or combinations thereof are time-delayed.

12. The apparatus of claim 1, wherein the first optical signal, the second optical signal, or both are composed of multiple wavelengths to introduce wavelength diversity, and wherein the one or more spatially distinct transmitters and the one or more spatially distinct receivers are wavelength-diverse.

13. The apparatus of claim 1, wherein the first optical signal, the second optical signal, the third optical signal or combinations thereof are filtered before the directing of the second optical signal.

14. The apparatus of claim 1, wherein the converting to the second electrical signal comprises mixing the third optical signal with a fourth optical signal according to coherent detection.

15. The apparatus of claim 1, wherein the controlling is performed by a processor, and wherein the receiving, the forming, the converting, the processing, the extracting, the controlling, or any combinations thereof is performed according to dithering, pilot signals, pilot frequency tones, pilot symbols, frequency shifts, or combinations thereof.

16. The apparatus of claim 1, wherein the spatially-diverse optical communication link is a bidirectional link.

17. The apparatus of claim 1, wherein the directing the second optical signal is performed in a similar manner to the forming of the third optical signal, and wherein the one or more parameters is utilized for controlling the directing of the second optical signal or the forming of the third optical signal or combinations thereof.

18. A non-transitory, machine-readable medium, comprising executable instructions that, when executed by a processing system including a processor, facilitate performance of operations, including:

receiving, via one or more spatially distinct receivers, a plurality of transmitted optical signals associated with a spatially-diverse optical communication link, wherein the plurality of transmitted optical signals are generated based on a system configured for generating a first optical signal, generating a first electrical signal from multi-gigabit digital input data, modulating the first optical signal according to the first electrical signal to produce a second optical signal, directing the second optical signal to one or more spatially distinct transmitters coupled to a plurality of turbulent channels to produce the plurality of transmitted optical signals;

forming a third optical signal based on a combination of the plurality of transmitted optical signals;

converting the third optical signal to a second electrical signal;

processing the second electrical signal to produce multi-gigabit digital output data, the multi-gigabit digital output data associated with the multi-gigabit digital input data;

extracting one or more parameters from the second electrical signal; and controlling, based on the one or more parameters, the forming of the third optical signal, the converting of the third optical signal, the processing of the second electrical signal, the extracting of the one or more parameters, or any combinations thereof, wherein the forming of the third optical signal utilizes a phase alignment stage, the phase alignment stage being based on a mesh of Mach-Zehnder modulators, a phase aligned optical combiner, a photonic lantern, or combinations thereof.

19. A method, comprising:

receiving, via one or more spatially distinct receivers, a plurality of transmitted optical signals associated with a spatially-diverse optical communication link, wherein the plurality of transmitted optical signals are generated based on a system configured for generating a first optical signal, generating a first electrical signal from multi-gigabit digital input data, modulating the first optical signal according to the first electrical signal to produce a second optical signal, directing the second optical signal to one or more spatially distinct transmitters coupled to a plurality of turbulent channels to produce the plurality of transmitted optical signals;

forming a third optical signal based on a combination of the plurality of transmitted optical signals;

converting the third optical signal to a second electrical signal;

processing the second electrical signal to produce multi-gigabit digital output data, the multi-gigabit digital output data associated with the multi-gigabit digital input data;

extracting one or more parameters from the second electrical signal; and controlling, based on the one or more parameters, the forming of the third optical signal, the converting of the third optical signal, the processing of the second electrical signal, the extracting of the one or more parameters, or any combinations thereof, wherein the forming of the third optical signal is performed via an adaptive optics system before being received by the one or more spatially distinct receivers, and wherein the adaptive optics system utilizes a deformable mirror or spatial light modulator controlled by the one or more parameters.

20. The method of claim 19, wherein the first electrical signal or the second electrical signal is digital, analog, or a combination thereof.

* * * * *